(12) United States Patent
Park et al.

(10) Patent No.: US 9,837,826 B2
(45) Date of Patent: Dec. 5, 2017

(54) RESONATING APPARATUS WITH INCREASED ISOLATION FOR STABLE WIRELESS POWER TRANSMISSION

(71) Applicant: Samsung Electronics Co., Ltd., Suwon-si (KR)

(72) Inventors: Jae Hyun Park, Yongin-si (KR); Dong Zo Kim, Yongin-si (KR); Young Ho Ryu, Yongin-si (KR); Sang Wook Kwon, Seongnam-si (KR); Ki Young Kim, Yongin-si (KR); Nam Yun Kim, Seoul (KR); Bong Chul Kim, Seoul (KR); Yun Kwon Park, Dongducheon-si (KR); Keum Su Song, Seoul (KR); Chi Hyung Ahn, Suwon-si (KR); Byoung Hee Lee, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 559 days.

(21) Appl. No.: 14/487,603

(22) Filed: Sep. 16, 2014

(65) Prior Publication Data
US 2015/0076921 A1  Mar. 19, 2015

(30) Foreign Application Priority Data
Sep. 16, 2013 (KR) .................. 10-2013-0111090

(51) Int. Cl.
 H02J 5/00 (2016.01)
 H02J 17/00 (2006.01)
 H02J 50/12 (2016.01)
(52) U.S. Cl.
 CPC .............. H02J 5/005 (2013.01); H02J 17/00 (2013.01); H02J 50/12 (2016.02)
(58) Field of Classification Search
 CPC .................................................... H02J 5/005
 USPC ........................................................ 307/104
 See application file for complete search history.

(56) References Cited

U.S. PATENT DOCUMENTS

2009/0230777 A1   9/2009  Baarman et al.
2010/0231340 A1*  9/2010  Fiorello .................. H01F 38/14
                                                336/92

\* cited by examiner

*Primary Examiner* — Joseph Chang
(74) *Attorney, Agent, or Firm* — NSIP Law

(57) ABSTRACT

A resonator has an increased isolation for stable wireless power transmission. A material that reduces resonance coupling may be disposed in a space between each of a plurality of resonators and a resonator adjacent to each of the plurality of resonators. A material that reduces resonance coupling may be disposed on a plane opposite to a direction in which a resonator resonates. Power at an operating frequency set to be equal to or within a predetermined range of a frequency corresponding to a resonant mode may be injected into a plurality of transmission resonators.

15 Claims, 25 Drawing Sheets

RESONATING APPARATUS WITH INCREASED ISOLATION FOR STABLE WIRELESS POWER TRANSMISSION

CROSS-REFERENCE TO RELATED APPLICATIONS

This application claims the benefit under 35 USC 119(a) of Korean Patent Application No. 10-2013-0111090 filed on Sep. 16, 2013, in the Korean Intellectual Property Office, the entire disclosure of which is incorporated herein by reference for all purposes.

BACKGROUND

1. Field

The following description relates to a wireless power transmission system.

2. Description of Related Art

Wireless power is energy that is transmitted from a wireless power transmitter to a wireless power receiver via magnetic coupling. A wireless power charging system includes a source device and a target device. The source device wirelessly transmits power, and the target device wirelessly receives power. The source device may be referred to as a wireless power transmitter, and the target device may be referred to as a wireless power receiver.

The source device includes a source resonator, and the target device includes a target resonator. Magnetic coupling or resonance coupling occurs between the source resonator and the target resonator.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a resonating apparatus for wireless power transmission includes a plurality of resonators separated from each other on a same plane; and a material configured to reduce resonance coupling among the plurality of resonators.

The material may be disposed between each of the plurality of resonators and an adjacent resonator of the plurality of resonators.

The material may be disposed on a plane opposite to a direction in which the plurality of resonators are configured to resonate.

The material may include either one or both of a magnetic material and a conductor.

In another general aspect, a resonating apparatus includes a plurality of resonators disposed on a same plane; wherein at least one of the plurality of resonators is disposed to overlap a portion of an adjacent resonator of the plurality of resonators to reduce resonance coupling with the adjacent resonator.

The plurality of resonators may be disposed to reduce resonance coupling between each of the plurality of resonators and an adjacent resonator of the plurality of resonators based on a characteristic that a direction of a magnetic field of an overlapping area in each of the plurality of resonators in which each of the plurality of resonators overlaps the adjacent resonator is opposite to a direction of a magnetic field of a non-overlapping area in each of the plurality of resonators in which each of the plurality of resonators does not overlap the adjacent resonator.

The plurality of resonators may be disposed to minimize an H-field surface integral value of each of the plurality of resonators.

At least one of the plurality of resonators may be divided into two areas having mutual fluxes in opposite directions, the two areas being disposed to cause absolute values of the mutual fluxes of the two areas to be equal to one another or within a predetermined range of one another.

The plurality of resonators may include at least three resonators.

In another general aspect, a transmission resonating apparatus includes a plurality of transmission resonators disposed on a same plane, each of the plurality of transmission resonators being configured to form a resonant mode with an adjacent transmission resonator among the plurality of transmission resonators; and a feeder configured to inject power into the plurality of transmission resonators at an operating frequency set to decrease coupling between each of the plurality of transmission resonators and the adjacent transmission resonator based on the resonant mode.

A difference between the operating frequency and a frequency corresponding to the resonant mode is than or equal to a predetermined value.

The resonant mode may include either one or both of an even mode in which a magnetic field generated in each of the plurality of transmission resonators and a magnetic field generated in the adjacent transmission resonator have a same direction, and an odd mode in which the magnetic field generated in each of the plurality of transmission resonators and the magnetic field generated in the adjacent transmission resonator have opposite directions.

The resonant mode may be the even mode; and a difference between the operating frequency and a frequency corresponding to the even mode may be less than or equal to a predetermined value.

The resonant mode may be the odd mode; and a difference between the operating frequency and a frequency corresponding to the odd mode may be less than or equal to a predetermined value.

The plurality of transmission resonators may be connected in parallel with each other; and the feeder may be connected in series with the plurality of transmission resonators connected in parallel with each other to inject power at the set operating frequency into the plurality of transmission resonators.

The plurality of transmission resonators may be connected in series with each other; and the feeder may be connected in parallel with the plurality of transmission resonators connected in series with each other to inject power at the set operating frequency into the plurality of transmission resonators.

The feeder may be further configured to inject power at the set operating frequency into the plurality of transmission resonators via inductive coupling.

In another general aspect, a resonating apparatus includes a plurality of resonators disposed in a same plane and configured so that each of the plurality of resonators is able to generate a magnetic field independently without being influenced by any other magnetic field generated by any other one of the plurality of resonators.

The resonating apparatus may further include an isolating material; and the plurality of resonators may be disposed so that the isolating material isolates each of the plurality of resonators from a magnetic field generated by every other one of the plurality of resonators.

Each of the plurality of resonators may include a non-overlapping area in which the resonator does not overlap any other one of the plurality of resonators, and an overlapping area in which the resonator overlaps every other one of the plurality of resonators that is adjacent to the resonator; and a size of the non-overlapping area and a size of the overlapping area may be selected to minimize an H-field surface field integral of the resonator.

Other features and aspects will be apparent from the following detailed description, the drawings, and the claims.

DETAILED DESCRIPTION

Figure 1:
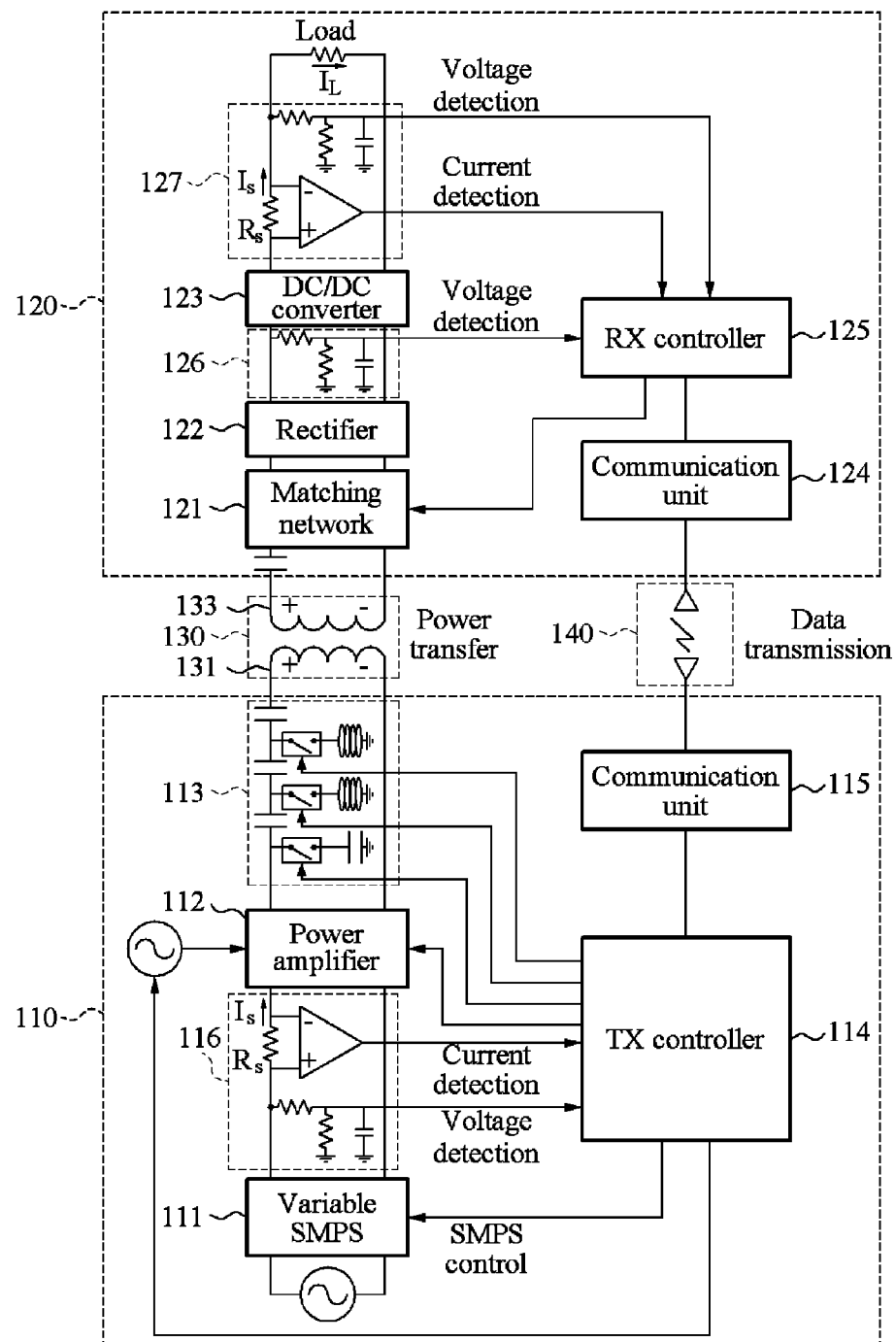
FIG. 1 illustrates an example of a wireless power and reception transmission system.

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

Schemes of performing communication between a source and a target include an in-band communication scheme and an out-of-band communication scheme. The in-band communication scheme is communication performed between the source and the target in the same frequency band that is used for power transmission. The out-of-band communication scheme is communication performed between the source and the target in a frequency band that is different from a frequency band used for power transmission.

FIG. 1 illustrates an example of a wireless power transmission and reception system.

Referring to FIG. 1, the wireless power transmission system and reception includes a source 110 and a target 120. The source 110 is a device configured to supply wireless power, and may be any electronic device capable of supplying power, such as, for example, a pad, a terminal, a table personal computer (PC), a television (TV), a medical device, or an electric vehicle. The target 120 is a device configured to receive wireless power, and may be any electronic device requiring power to operate, such as, for example, a pad, a terminal, a tablet PC, a TV, a smart watch, a medical device, an electric vehicle, a washing machine, a radio, or a lighting system.

The source 110 includes a variable switching mode power supply (SMPS) 111, a power amplifier (PA) 112, a matching network 113, a transmission (TX) controller 114, such as, for example, TX control logic, a communication unit 115, and a power detector 116.

The variable SMPS 111 generates a direct current (DC) voltage by switching an alternating current (AC) voltage having a frequency of tens of hertz (Hz) output from a power supply. The variable SMPS 111 may output a fixed DC voltage having a predetermined level, or may output an adjustable DC voltage having an adjustable level under the control of the TX controller 114.

The power detector 116 detects an output current and an output voltage of the variable SMPS 111, and provides, to the TX controller 114, information on the detected output current and the detected output voltage. Also, the power detector 116 detects an input current and an input voltage of the power amplifier 112.

The power amplifier 112 generates power by converting a DC voltage having a predetermined level supplied to the power amplifier 112 by the variable SMPS 111 to an AC voltage using a switching pulse signal having a frequency of a few megahertz (MHz) to tens of MHz. For example, the power amplifier 112 may convert the DC voltage supplied to the power amplifier 112 to an AC voltage having a reference resonant frequency $F_{Ref}$, and may generate communication power used for communication, and/or charging power used for charging. The communication power and the charging power may be used in a plurality of targets.

The communication power may be a low power of 0.1 milliwatt (mW) to 1 mW. The charging power may be a high power of 1 mW to 200 W that is consumed by a load of a target. As used herein, the term "charging" refers to supplying power to a unit or element configured to charge a battery or other rechargeable device with power. Additionally, the term "charging" may refer to supplying power to a unit or element configured to consume power. The units or elements may be, for example, a battery, a display, a sound output circuit, a main processor, or any of various types of sensors.

As used herein, the term "reference resonant frequency" refers to a resonant frequency nominally used by the source 110, and the term "tracking frequency" refers to a resonant frequency used by the source 110 that has been adjusted based on a preset scheme.

The TX controller 114 detects a reflected wave of the communication power or the charging power, and detects mismatching that occurs between a target resonator 133 and a source resonator 131 based on the detected reflected wave. To detect the mismatching, for example, the TX controller 114 may detect an envelope of the reflected wave, a power amount of the reflected wave, or any other characteristic of the reflected wave that is affected by mismatching.

The matching network 113 compensates for impedance mismatching between the source resonator 131 and the target resonator 133 to achieve optimal matching under the control of the TX controller 114. The matching network 113 includes a plurality of switches each connected to a capacitor or an inductor, and the switches are controlled by the TX controller 114 to achieve optimal matching.

The TX controller 114 calculates a voltage standing wave ratio (VSWR) based on a voltage level of the reflected wave and a level of an output voltage of the source resonator 131 or the power amplifier 112. For example, when the VSWR is greater than a predetermined value, the TX controller 114 detects that there is mismatching between the source resonator 131 and the target resonator 133.

When the TX controller 114 detects that the VSWR is greater than the predetermined value, the TX controller 114 may compute a wireless power transmission efficiency for each of N tracking frequencies, determine a tracking frequency $F_{Best}$ providing the best wireless power transmission efficiency among the N tracking frequencies, and change the reference resonant frequency $F_{Ref}$ to the tracking frequency $F_{Best}$. The N tracking frequencies may be set in advance.

The TX controller 114 may adjust a frequency of the switching pulse signal used by the power amplifier 112. The frequency of the switching pulse signal may be determined under the control of the TX controller 114. For example, by controlling the frequency of the switching pulse signal used by the power amplifier 112, the TX controller 114 may generate a modulated signal to be transmitted to the target 120. In other words, the TX controller 114 may transmit a variety of data to the target 120 using in-band communication. The TX controller 114 may also detect a reflected wave, and may demodulate a signal received from the target 120 based on an envelope of the detected reflected wave.

The TX controller 114 may generate a modulated signal for in-band communication using various methods. For example, the TX controller 114 may generate the modulated signal by turning on or off a switching pulse signal used by the power amplifier 112, by performing delta-sigma modulation or by any other modulation method known to one of ordinary skill in the art. Additionally, the TX controller 114 may generate a pulse-width modulated (PWM) signal having a predetermined envelope.

The communication unit 115 may perform out-of-band communication using a separate communication channel. The communication unit 115 may include a communication module, such as a ZigBee module, a Bluetooth module, or any other communication module known to one of ordinary skill in the art that the communication unit 115 may use to transmit and receive data 140 to and from the target 120 via the out-of-band communication.

The source resonator 131 transfers electromagnetic energy 130 to the target resonator 133. For example, the source resonator 131 transfers the communication power or the charging power to the target 120 via magnetic coupling with the target resonator 133.

As illustrated in FIG. 1, the target 120 includes a matching network 121, a rectifier 122, a DC/DC converter 123, a communication unit 124, a reception (RX) controller 125, such as, for example, RX control logic, a voltage detector 126, and a power detector 127.

The target resonator 133 receives the electromagnetic energy 130 from the source resonator 131. For example, the target resonator 133 receives the communication power or the charging power from the source 110 via magnetic coupling with the source resonator 131. Additionally, the target resonator 133 may receive a variety of data from the source 110 via the in-band communication.

The matching network 121 matches an input impedance viewed from the source 110 to an output impedance viewed from a load of the target 120. The matching network 121 may be configured to have at least one capacitor and at least one inductor.

The rectifier 122 generates a DC voltage by rectifying an AC voltage received by the target resonator 133.

The DC/DC converter 123 adjusts a level of the DC voltage generated by the rectifier 122 based on a voltage required by the load. As an example, the DC/DC converter 123 may adjust the level of the DC voltage output from the rectifier 122 to a level in a range of 3 volts (V) to 10 V.

The voltage detector 126 detects a voltage of an input terminal of the DC/DC converter 123, and the power detector 127 detects a current and a voltage of an output terminal of the DC/DC converter 123. The detected voltage of the input terminal 126 may be used by the RX controller 125 to calculate a wireless power transmission efficiency of power received from the source 110. The detected current and the detected voltage of the output terminal may be used by the RX controller 125 to calculate an amount of power actually transferred to the load. The TX controller 114 of the source 110 may calculate an amount of power that needs to be transmitted by the source 110 to the target 120 based on an amount of power required by the load and the amount of power actually transferred to the load.

If the amount of power actually transferred to the load calculated by the RX controller 125 is transmitted to the source 110 by the communication unit 124, the TX controller 114 may calculate an amount of power that needs to be transmitted to the target 120, and may control either one or both of the variable SMPS 111 and the power amplifier 112 to generate an amount of power that will enable the calculated amount of power to be transmitted by the source 110.

The communication unit 124 performs in-band communication to transmit and receive data to and from the source 110 using a resonant frequency. During the in-band communication, the RX controller 125 demodulates a received signal by detecting a signal between the target resonator 133 and the rectifier 122, or detecting an output signal of the rectifier 122. In other words, the RX controller 125 may demodulate a message received using the in-band communication.

Additionally, the RX controller 125 adjusts an impedance of the target resonator 133 using the matching network 121 to modulate a signal to be transmitted to the source 110. For example, the RX controller 125 may adjust the matching network 121 to increase the impedance of the target resonator 133 so that a reflected wave may be detected by the TX controller 114 of the source 110. Depending on whether the reflected wave is detected, the TX controller 114 may detect a first value, for example, a binary number "0," or a second value, for example, a binary number "1." For example, when the reflected wave is detected, the TX controller 114 may detect "0", and when the reflected wave is not detected, the TX controller 114 may detect "1". Alternatively, when the reflected wave is detected, the TX controller 114 may detect "1", and when the reflected wave is not detected, the TX controller 114 may detect "0".

The communication unit 124 of the target 120 may transmit a response message to the communication unit 115 of the source 110. For example, the response message may include any one or any combination of a product type of the target 120, manufacturer information of the target 120, a model name of the target 120, a battery type of the target 120, a charging scheme of the target 120, an impedance value of a load of the target 120, information on characteristics of the target resonator 133 of the target 120, information on a frequency band used by the target 120, an amount of a power consumed by the target 120, an identifier (ID) of the target 120, product version information of the target 120, standard information of the target 120, and any other information about the target 120.

The communication unit 124 may perform out-of-band communication using a separate communication channel. For example, the communication unit 124 may include a communication module, such as a ZigBee module, a Bluetooth module, or any other communication module known to one of ordinary skill in the art that the communication unit 124 may use to transmit and receive the data 140 to and from the source 110 via the out-of-band communication.

The communication unit 124 may receive a wake-up request message from the source 110, and the power detector 127 may detect an amount of power received by the target resonator 133. The communication unit 124 may transmit to the source 110 information on the detected amount of the power received by the target resonator 133. The information on the detected amount of the power may include, for example, an input voltage value and an input current value of the rectifier 122, an output voltage value and an output current value of the rectifier 122, an output voltage value and an output current value of the DC/DC converter 123, and any other information about the detected amount of the power received by the target resonator 133.

The TX controller 114 may set a resonance bandwidth of the source resonator 131. Based on the set resonance bandwidth of the source resonator 131, a Q-factor $Q_S$ of the source resonator 131 may be determined. For example, the TX controller 114 may set the resonance bandwidth of the source resonator 131 to be wider or narrower than the resonance bandwidth of the target resonator 133.

The RX controller 125 may set a resonance bandwidth of the target resonator 133. Based on the set resonance bandwidth of the target resonator 133, a Q-factor $Q_D$ of the target resonator 133 may be determined. For example, the RX controller 125 may set the resonance bandwidth of the target resonator 133 to be wider or narrower than the resonance bandwidth of the source resonator 131.

The source 110 and the target 120 may communicate with each other to share information about the resonance bandwidths of the source resonator 131 and the target resonator 133. For example, when a power higher than a reference value is requested by the target 120, the Q-factor $Q_S$ of the source resonator 131 may be set to a value greater than 100. Conversely, a power lower than the reference value is requested by the target 120, the Q-factor $Q_S$ of the source resonator 131 may be set to a value less than 100.

In a resonance-based wireless power transmission, the resonance bandwidth may be an important factor. A Q-factor Qt of energy coupling between the source resonator 131 and the target resonator 133 is affected by a change in a distance between the source resonator 131 and the target resonator 133, a change in a resonance impedance, impedance mismatching, a reflected signal, or a change in any other factor affecting a Q-factor. Qt is inversely proportional to the resonance bandwidth as expressed by the following Equation 1.

$$\frac{\Delta_f}{f_0} = \frac{1}{Qt} \qquad (1)$$
$$= \Gamma_{S,D} + \frac{1}{BW_S} + \frac{1}{BW_D}$$

In Equation 1, $f_0$ denotes a center frequency, $\Delta f$ denotes a bandwidth, $\Gamma_{S,D}$ denotes a reflection loss between the source resonator 131 and the target resonator 133, $BW_S$ denotes a resonance bandwidth of the source resonator 131, and $BW_D$ denotes a resonance bandwidth of the target resonator 133.

In a wireless power transmission, a wireless power transmission efficiency U may be expressed by the following Equation 2.

$$U = \frac{\kappa}{\sqrt{\Gamma_S \Gamma_D}} = \frac{\omega_0 M}{\sqrt{R_S R_D}} = \frac{\sqrt{Q_S Q_D}}{Q_\kappa} \qquad (2)$$

In Equation 2, $\kappa$ denotes a coupling coefficient of energy coupling between the source resonator 131 and the target resonator 133, $\Gamma_S$ denotes a reflection coefficient of the source resonator 131, $\Gamma_D$ denotes a reflection coefficient of the target resonator 133, $\omega_0$ denotes a resonant frequency of the source resonator 133 and the target resonator 133, M denotes a mutual inductance between the source resonator 131 and the target resonator 133, $R_S$ denotes an impedance of the source resonator 131, $R_D$ denotes an impedance of the target resonator 133, $Q_S$ denotes a Q-factor of the source resonator 131, $Q_D$ denotes a Q-factor of the target resonator 133, and $Q_\kappa$ denotes a Q-factor of energy coupling between the source resonator 131 and the target resonator 133, and is the same as Qt discussed above in connection with Equation 1.

As can be seen from Equation 2, the Q-factors $Q_S$ and $Q_D$ have a great effect on the wireless power transmission efficiency U.

Accordingly, the Q-factors $Q_S$ and $Q_D$ may be set to high values to increase the wireless power transmission efficiency U. However, even when Q-factors $Q_S$ and $Q_D$ are set to extremely high values, the wireless power transmission efficiency U may be reduced due to a change in the coupling coefficient $\kappa$ of energy coupling, a change in a distance between the source resonator 131 and the target resonator 133, a change in a resonance impedance, impedance mismatching, or a change in any other factor affecting the wireless power transmission efficiency U.

If the resonance bandwidths $BW_S$ and $BW_D$ of the source resonator 131 and the target resonator 133 are set to be very narrow to increase the wireless power transmission efficiency U, impedance mismatching between the source resonator 131 and the target resonator 133 may easily occur due to even insignificant external influences. In terms of impedance mismatching, Equation 1 may be rewritten as the following Equation 3.

$$\frac{\Delta f}{f_0} = \frac{\sqrt{VSWR} - 1}{Qt\sqrt{VSWR}} \quad (3)$$

In an example in which an unbalanced relationship of a bandwidth of an impedance matching frequency or a resonance bandwidth between the source resonator 131 and the target resonator 133 is maintained, a decrease in the wireless power transmission efficiency U may be prevented. The decrease in the wireless power transmission efficiency U may be a result of a change in the coupling coefficient κ of energy coupling, a change in the distance between the source resonator 131 and the target resonator 133, a change in the resonance impedance, impedance mismatching, or any other factor affecting the wireless power transmission efficiency U.

According to Equation 1 through Equation 3, when the bandwidth of the impedance matching frequency or the resonance bandwidth between the source resonator 131 and the target resonator 133 remains unbalanced, the Q-factors $Q_S$ and $Q_D$ of the source resonator 131 and the Q-factor of the target resonator 133 may remain unbalanced.

In FIG. 1, the source 110 may wirelessly transmit a wake-up power to be used to wake up the target 120, and may broadcast a configuration signal to configure a wireless power transmission network. The source 110 may receive, from the target 120, a search frame including a reception sensitivity value of the configuration signal in the target 120, allow the target 120 to join the wireless power transmission network, and transmit an identifier to the target 120 to identify the target 120 in the wireless power transmission network. The source 110 may generate charging power through a power control, and wirelessly transmit the charging power to the target 120.

In addition, the target 120 may receive a wake-up power from at least one of a plurality of sources. The target 120 may activate a communication function using the wake-up power. The target 120 may receive a configuration signal to configure a wireless power transmission network from each of the plurality of sources. As an example, the target 120 may select one of the plurality of sources, such as the source 110 in FIG. 1, based on a reception sensitivity of the configuration signal in the target 120, and wirelessly receive power from the selected source 110.

In the following description of FIGS. 2A through 4B, unless otherwise indicated, the term "resonator" may refer to both a source resonator and a target resonator. The resonator of FIGS. 2A through 4B may be used as the resonators described with respect to FIGS. 1 and 5 through 19.

Figure 2A:
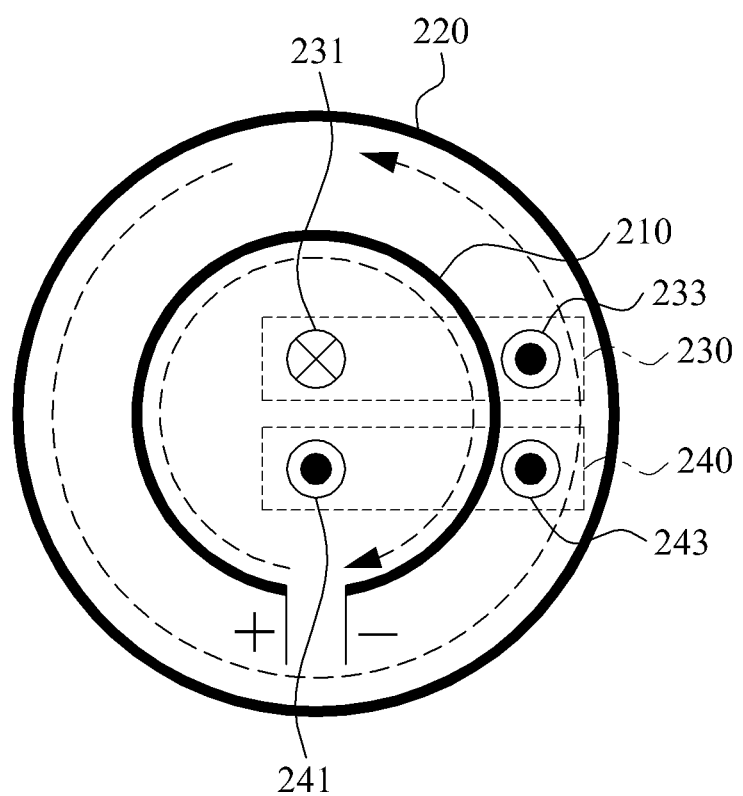
FIGS. 2A and 2B illustrate examples of a distribution of a magnetic field in a feeder and a resonator.
Figure 2B:
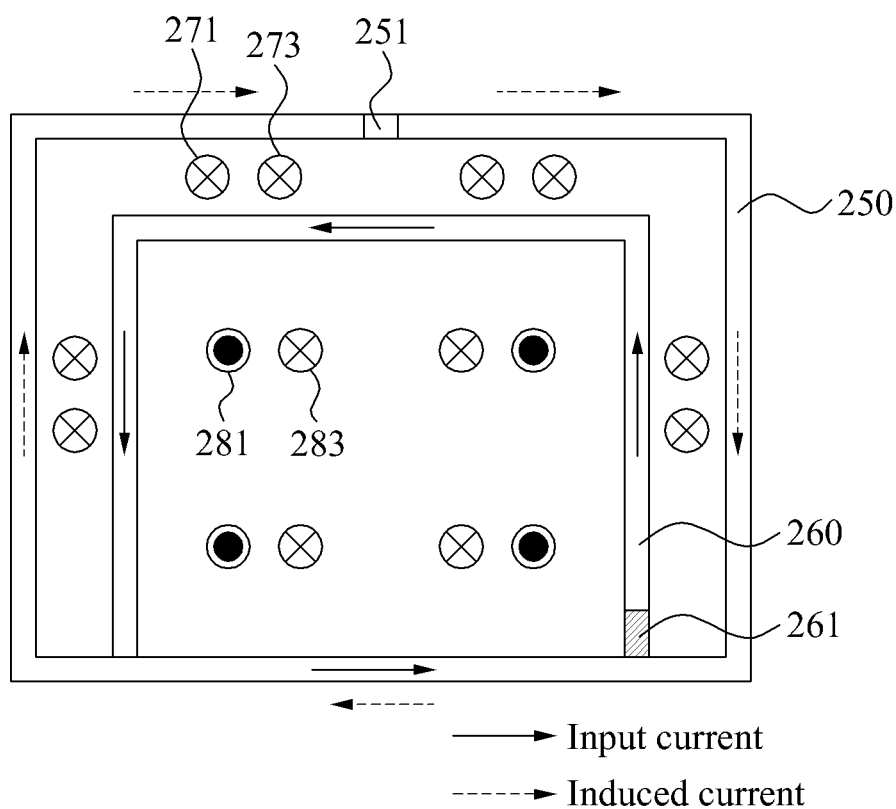

FIGS. 2A and 2B illustrate examples of a distribution of a magnetic field in a feeder and a resonator.

When a resonator receives power supplied through a separate feeder, magnetic fields are generated in both the feeder and the resonator.

A source resonator and a target resonator may each have a dual loop structure including an external loop and an internal loop.

FIG. 2A illustrates an example of a structure of a wireless power transmitter in which a feeder 210 and a resonator 220 do not have a common ground. Referring to FIG. 2A, when input current flows into the feeder 210 through a terminal labeled "+" and out of the feeder 210 through a terminal labeled "−", a magnetic field 230 is generated by the input current. A direction 231 of the magnetic field 230 inside the feeder 210 is into the plane of FIG. 2A, and is opposite to a direction 233 of the magnetic field 230 outside the feeder 210, which is out of the plane of FIG. 2A. The magnetic field 230 generated by the feeder 210 induces a current in the resonator 220. A direction of the induced current in the resonator 220 is opposite to a direction of the input current in the feeder 210 as indicated by the dashed lines with arrowheads in FIG. 2A.

The induced current in the resonator 220 generates a magnetic field 240. Directions of the magnetic field generated by the induced current are the same at all positions inside the resonator 220, and are out of the plane of FIG. 2A. Accordingly, a direction 241 of the magnetic field 240 generated by the resonator 220 inside the feeder 210 is the same as a direction 243 of the magnetic field 240 generated by the resonator 220 outside the feeder 210.

Consequently, when the magnetic field 230 generated by the feeder 210 and the magnetic field 240 generated by the resonator 220 are combined, a strength of the total magnetic field decreases inside the feeder 210, but increases outside the feeder 210. Accordingly, when power is supplied to the resonator 220 via the feeder 210 configured as illustrated in FIG. 2A, the strength of the total magnetic field decreases in the portion of the resonator 220 inside the feeder 210, but in the portion of the resonator 220 outside the feeder 210. When a distribution of the magnetic field in the resonator 220 is random or not uniform, it may be difficult to perform impedance matching because an input impedance may frequently vary. Additionally, when the strength of the total magnetic field increases, a wireless power transmission efficiency increases. Conversely, when the strength of the total magnetic field decreases, the wireless power transmission efficiency decreases. Accordingly, the wireless power transmission efficiency may be reduced on average.

FIG. 2B illustrates an example of a structure of a wireless power transmitter in which a resonator 250 and a feeder 260 have a common ground. The resonator 250 includes a capacitor 251. The feeder 260 receives an RF signal via a port 261. When the RF signal is input to the feeder 260, an input current is generated in the feeder 260. The input current flowing in the feeder 260 generates a magnetic field, and a current is induced in the resonator 250 by the magnetic field. Also another magnetic field is generated by the induced current flowing in the resonator 250. In this example, a direction of the input current flowing in the feeder 260 is opposite to a direction of the induced current flowing in the resonator 250. Accordingly, in a region between the resonator 250 and the feeder 260, a direction 271 of the magnetic field generated by the input current is the same as a direction 273 of the magnetic field generated by the induced current, and thus the strength of the total magnetic field increases in the region between the resonator 250 and the feeder 260. Conversely, inside the feeder 260, a direction 281 of the magnetic field generated by the input current is opposite to a direction 283 of the magnetic field generated by the induced current, and thus the strength of the total magnetic field decreases inside the feeder 260. Therefore, the strength of the total magnetic field decreases in the portion of the resonator 250 inside the feeder 260, i.e., in a center of the resonator 250, but increases in the portion of the resonator 250 outside the feeder 260, i.e., near an outer periphery of the resonator 260.

An input impedance may be adjusted by adjusting an internal area of the feeder 260. The input impedance is an impedance viewed in a direction from the feeder 260 to the resonator 250. When the internal area of the feeder 260 increases, the input impedance increases. Conversely, when the internal area of the feeder 260 decreases, the input impedance decreases. However, if the magnetic field is randomly or not uniformly distributed in the resonator 250, the input impedance may vary based on a location of a target even if the internal area of the feeder 260 has been adjusted to adjust the input impedance to match the output impedance of a power amplifier for a specific location of the target. Accordingly, a separate matching network may be needed to match the input impedance to the output impedance of the power amplifier. For example, when the input impedance increases, a separate matching network may be needed to match the increased input impedance to a relatively low output impedance of the power amplifier.

As an example, when a receiving resonator has the same configuration as the transmitting resonator 250, and when a feeder of the receiving resonator has the same configuration as the feeder 260, a separate matching network may be needed because a direction of a current flowing in the receiving resonator is opposite to a direction of an induced current flowing in the feeder of the receiving resonator.

Figure 3A:
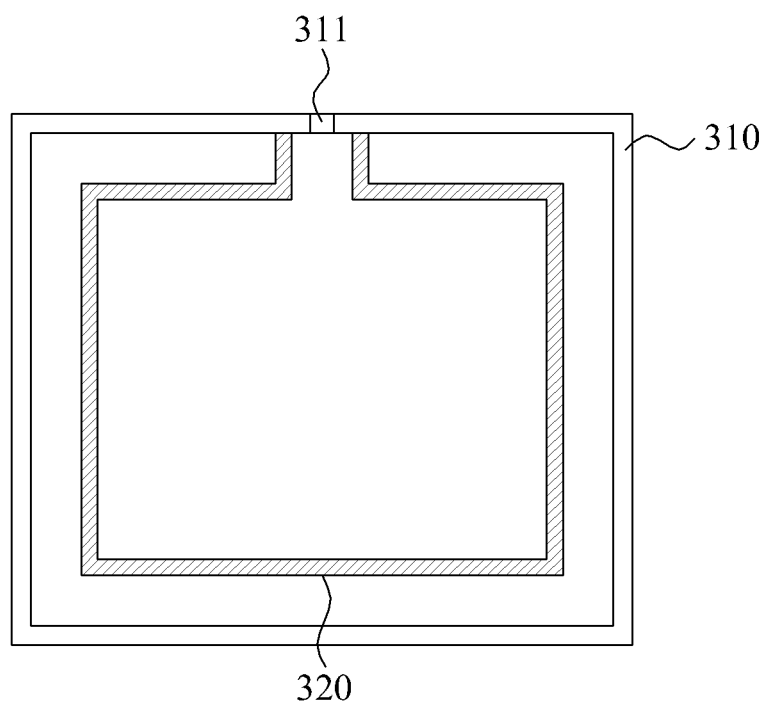
FIGS. 3A and 3B illustrate an example of a wireless power transmitter.
Figure 3B:
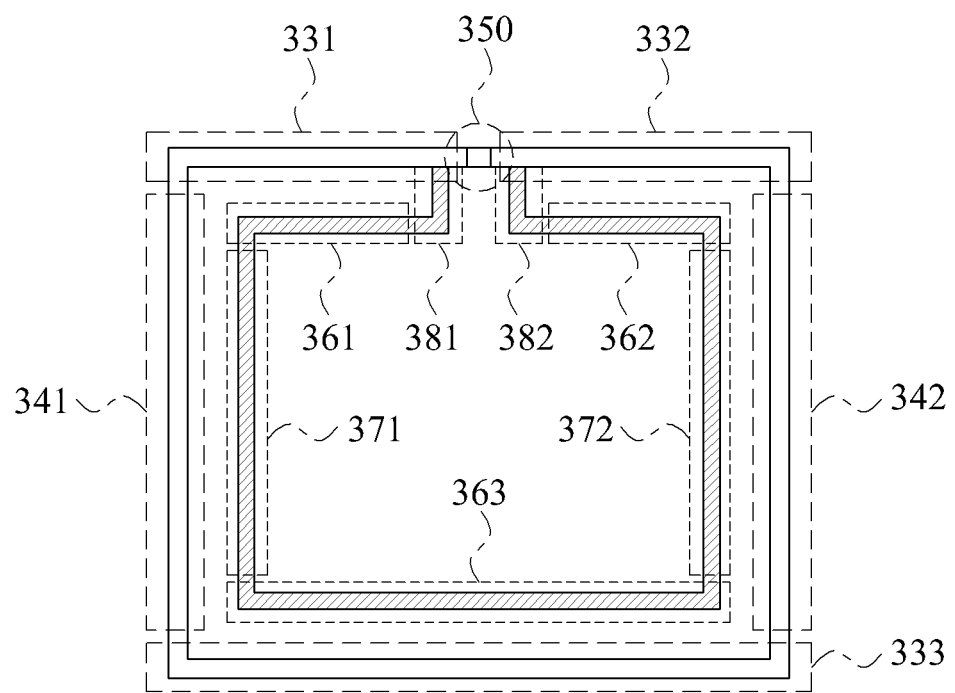

FIGS. 3A and 3B illustrate an example of a wireless power transmitter.

Referring to FIG. 3A, the wireless power transmitter includes a resonator 310 and a feeder 320. The resonator 310 includes a capacitor 311. The feeder 320 is electrically connected to both ends of the capacitor 311.

FIG. 3B illustrates the structure of the wireless power transmitter of FIG. 3A in greater detail. The resonator 310 includes a first transmission line (not identified by a reference numeral in FIG. 3B, but formed by various elements in FIG. 3B as discussed below), a first conductor 341, a second conductor 342, and at least one capacitor 350.

The capacitor 350 is connected in series between a first signal conducting portion 331 and a second signal conducting portion 332 in the first transmission line, causing an electric field to be concentrated in the capacitor 350. In general, a transmission line includes at least one conductor disposed in an upper portion of the first transmission line, and at least one conductor disposed in a lower portion of the first transmission line. A current may flow through the at least one conductor disposed in the upper portion of the transmission line, and the at least one conductor disposed in the lower portion of the transmission line may be electrically grounded. In the example in FIG. 3B, a conductor disposed in the upper portion of the first transmission line is separated into two portions that will be referred to as the first signal conducting portion 331 and the second signal conducting portion 332, and a conductor disposed in the lower portion of the first transmission line will be referred to as a first ground conducting portion 333.

As illustrated in FIG. 3B, the resonator 310 has a generally two-dimensional (2D) structure. The first transmission line includes the first signal conducting portion 331 and the second signal conducting portion 332 disposed in the upper portion of the first transmission line, and the first ground conducting portion 333 disposed in the lower portion of the first transmission line. The first signal conducting portion 331 and the second signal conducting portion 332 are disposed to face the first ground conducting portion 333. A current flows through the first signal conducting portion 331 and the second signal conducting portion 332.

Additionally, one end of the first signal conducting portion 331 is connected to one end of the first conductor 341, the other end of the first signal conducting portion 331 is connected to one end of the capacitor 350, and the other end of the first conductor is connected to one end of the first grounding portion 333. One end of the second signal conducting portion 332 is connected to one end of the second conductor 342, the other end of the second signal conducting portion 332 is connected to the other end of the capacitor 350, and the other end of the second conductor 342 is connected to the other end of the first grounding portion 333. Accordingly, the first signal conducting portion 331, the second signal conducting portion 332, the first ground conducting portion 333, the first conductor 341, and the second conductor 342 are connected to each other, causing the resonator 310 to have an electrically closed loop structure. The term "loop structure" includes a polygonal structure, a circular structure, a rectangular structure, or any other geometrical structure that is closed, i.e., a geometrical structure that does not have any opening in its perimeter. The expression "having a loop structure" indicates a circuit that is electrically closed.

The capacitor 350 is inserted into an intermediate portion of the first transmission line. In the example in FIG. 3B, the capacitor 350 is inserted into a space between the first signal conducting portion 331 and the second signal conducting portion 332. The capacitor 350 may be a lumped element capacitor, a distributed element capacitor, or any other type of capacitor known to one of ordinary skill in the art. For example, a distributed element capacitor may include zigzagged conductor lines and a dielectric material having a high permittivity disposed between the zigzagged conductor lines.

The capacitor 350 inserted into the first transmission line may cause the resonator 310 to have a characteristic of a metamaterial. A metamaterial is a material having an electromagnetic characteristic that is not found in nature, and thus may have an artificially designed structure. All materials existing in nature have a magnetic permeability and a permittivity. Most materials have a positive magnetic permeability and a positive permittivity.

In the case of most materials, a right-hand rule may be applied to an electric field, a magnetic field, and a Poynting vector, so the corresponding materials may be referred to as right-handed materials (RHMs). However, a metamaterial having a magnetic permeability and/or a permittivity not found in nature may be classified into an epsilon negative (ENG) material, a mu negative (MNG) material, a double negative (DNG) material, a negative refractive index (NRI) material, a left-handed (LH) material, or any other metamaterial classification known to one of ordinary skill in the art based on a sign of the permittivity of the metamaterial and a sign of the magnetic permeability of the metamaterial.

If the capacitor 350 is lumped element capacitor and the capacitance of the capacitor 350 is appropriately determined, the resonator 310 may have a characteristic of a metamaterial. If the resonator 310 is caused to have a negative magnetic permeability by appropriately adjusting the capacitance of the capacitor 350, the resonator 310 may also be referred to as an MNG resonator. Various criteria may be applied to determine the capacitance of the capacitor 350. For example, the various criteria may include a criterion for enabling the resonator 310 to have the characteristic of the metamaterial, a criterion for enabling the resonator 310 to have a negative magnetic permeability at a target frequency, a criterion for enabling the resonator 310 to have a zeroth-order resonance characteristic at the target frequency, and any other suitable criterion. Based on any one criterion or any combination of the aforementioned criteria, the capacitance of the capacitor 350 may be appropriately determined.

The resonator 310, hereinafter referred to as the MNG resonator 310, may have a zeroth-order resonance characteristic of having a resonant frequency when a propagation constant is 0. When the resonator 310 has a zeroth-order resonance characteristic, the resonant frequency is independent of a physical size of the MNG resonator 310. By changing the capacitance of the capacitor 350, the resonant frequency of the MNG resonator 310 may be changed without changing the physical size of the MNG resonator 310.

In a near field, the electric field is concentrated in the capacitor 350 inserted into the first transmission line, causing the magnetic field to become dominant in the near field. The MNG resonator 310 has a relatively high Q-factor when the capacitor 350 is a lumped element capacitor, and thereby increasing a wireless power transmission efficiency. The Q-factor indicates a level of an ohmic loss or a ratio of a reactance with respect to a resistance in the wireless power transmission. As will be understood by one of ordinary skill in the art, the wireless power transmission efficiency will increase as the Q-factor increases.

Although not illustrated in FIG. 3B, a magnetic core passing through the MNG resonator 310 may be provided to increase a wireless power transmission distance.

Referring to FIG. 3B, the feeder 320 includes a second transmission line (not identified by a reference numeral in FIG. 3B, but formed by various elements in FIG. 3B as discussed below), a third conductor 371, a fourth conductor 372, a fifth conductor 381, and a sixth conductor 382.

The second transmission line includes a third signal conducting portion 361 and a fourth signal conducting portion 362 disposed in an upper portion of the second transmission line, and a second ground conducting portion 363 disposed in a lower portion of the second transmission line. The third signal conducting portion 361 and the fourth signal conducting portion 362 are disposed to face the second ground conducting portion 363. A current flows through the third signal conducting portion 361 and the fourth signal conducting portion 362.

Additionally, one end of the third signal conducting portion 361 is connected to one end of the third conductor 371, the other end of the third signal conducting portion 361 is connected to one end of the fifth conductor 381, and the other end of the third signal conducting portion is connected to one end of the second ground conducting portion 363. One end of the fourth signal conducting portion 362 is connected to one end of the fourth conductor 372, the other end of the fourth signal conducting portion 362 is connected to one end of the sixth conductor 382, and the other end of the fourth conductor is connected to the other end of the second ground conducting portion 363. The other end of the fifth conductor 381 is connected to the first signal conducting portion 331 at or near where the first signal conducting portion 331 is connected to one end of the capacitor 350, and the other end of the sixth conductor 382 is connected to the other end of the second signal conducting portion 332 at or near where the second signal conducting portion 332 is connected to the other end of the capacitor 250. Thus, the fifth conductor 381 and the sixth conductor 382 are connected in parallel with both ends of the capacitor 350. The fifth conductor 381 and the sixth conductor 382 may be used as input ports to receive an RF signal as an input.

Accordingly, the third signal conducting portion 361, the fourth signal conducting portion 362, the second ground conducting portion 363, the third conductor 371, the fourth conductor 372, the fifth conductor 381, the sixth conductor 382, and the resonator 310 are connected to each other, causing the resonator 310 and the feeder 320 to have an electrically closed loop structure. The term "loop structure" includes a polygonal structure, a circular structure, a rectangular structure, and any other geometrical structure that does not have any opening in its perimeter. The expression "having a loop structure" indicates a structure that is electrically closed.

If an RF signal is input to the fifth conductor 381 or the sixth conductor 382, an input current flows in the feeder 320 and the resonator 310, generating a magnetic field that induces a current in the resonator 310. A direction of the input current flowing in the feeder 320 is the same as a direction of the induced current flowing in the resonator 310, thereby causing a strength of the total magnetic field in the resonator 310 to increase inside the feeder 320, but decrease outside the feeder 320.

An input impedance is determined by an area of a region between the resonator 310 and the feeder 320. Accordingly, a separate matching network used to match the input impedance to an output impedance of a power amplifier may not be needed. However, even if matching network is used, the input impedance may be adjusted by adjusting a size of the feeder 320, and accordingly a structure of the matching network may be simplified. The simplified structure of the matching network reduces a matching loss of the matching network.

The second transmission line, the third conductor 371, the fourth conductor 372, the fifth conductor 381, and the sixth conductor 382 of the feeder 320 may have the same structure as the resonator 310. For example, if the resonator 310 has a loop structure, the feeder 320 may also have a loop structure. In another example, if the resonator 310 has a circular structure, the feeder 320 may also have a circular structure.

Figure 4A:
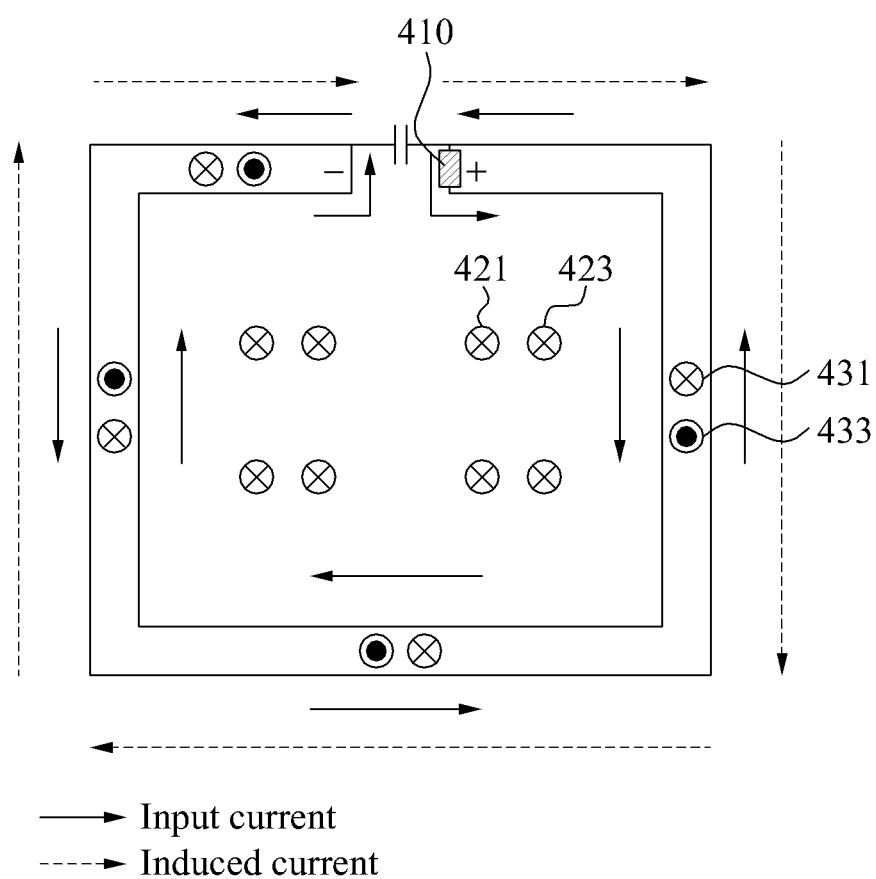
FIG. 4A illustrates an example of a distribution of a magnetic field inside a resonator produced by feeding a feeder.

FIG. 4A illustrates an example of a distribution of a magnetic field inside a resonator produced by feeding a feeder. FIG. 4A more simply illustrates the resonator 310 and the feeder 320 of FIGS. 3A and 3B, and the names and the reference numerals of the various elements in FIGS. 3A and 3B will be used in the following description of FIG. 4A for ease of description.

A feeding operation may be an operation of supplying power to a source resonator in a wireless power transmission, or an operation of supplying AC power to a rectifier in the wireless power transmission. FIG. 4A illustrates a direction of an input current flowing in the feeder 320, and a direction of an induced current induced in the resonator 310. Additionally, FIG. 4A illustrates a direction of a magnetic field generated by the input current of the feeder 320, and a direction of a magnetic field generated by the induced current of the source resonator 310.

Referring to FIG. 4A, the fifth conductor 381 or the sixth conductor 382 of the feeder 320 of FIG. 3A may be used as an input port 410. In the example in FIG. 3A, the sixth conductor 382 is being used as the input port 410. The input port 410 receives an RF signal as an input. The RF signal may be output from a power amplifier. The power amplifier may increase or decrease an amplitude of the RF signal based on a power requirement of a target. The RF signal received by the input port 410 is represented in FIG. 4A as an input current flowing in the feeder 320. The input current flows in a clockwise direction in the feeder 320 along the second transmission line of the feeder 320. The fifth conductor 381 and the sixth conductor 382 of the feeder 320 are electrically connected to the resonator 310. More specifically, the fifth conductor 381 of the feeder 320 is connected to the first signal conducting portion 331 of the resonator 310, and the sixth conductor 382 of the feeder 320 is connected to the second signal conducting portion 332 of the resonator 310. Accordingly, the input current flows in both the resonator 310 and the feeder 320. The input current flows in a counterclockwise direction in the resonator 310. The input current flowing in the resonator 310 generates a magnetic field, and the magnetic field induces a current in the resonator 310. The induced current flows in a clockwise direction in the resonator 310. The induced current in the resonator 310 supplies energy to the capacitor 311 of the resonator 310, and also generates a magnetic field. In this example, the input current flowing in the feeder 320 and the resonator 310 of FIG. 3A is indicated by the solid lines with arrowheads in FIG. 4A, and the induced current flowing in the resonator 310 is indicated by the dashed lines with arrowheads in FIG. 4A.

A direction of a magnetic field generated by a current is determined based on the right-hand rule. As illustrated in FIG. 4A, inside the feeder 320, a direction 421 of the magnetic field generated by the input current flowing in the feeder 320 is the same as a direction 423 of the magnetic field generated by the induced current flowing in the resonator 310. Accordingly, the strength of the total magnetic field increases inside the feeder 320.

In contrast, in a region between the feeder 320 and the resonator 310, a direction 433 of a magnetic field generated by the input current flowing in the feeder 320 is opposite to a direction 431 of a magnetic field generated by the induced current flowing in the resonator 310. Accordingly, the strength of the total magnetic field decreases in the region between the feeder 320 and the resonator 310.

Typically, in a resonator having a loop structure, a strength of a magnetic field decreases in the center of the resonator, and increases near an outer periphery of the resonator. However, referring to FIG. 4A, since the feeder 320 is electrically connected to both ends of the capacitor 311 of the resonator 310, the direction of the induced current in the resonator 310 is the same as the direction of the input current in the feeder 320. Since the induced current in the resonator 320 flows in the same direction as the input current in the feeder 320, the strength of the total magnetic field increases inside the feeder 320, and decreases outside the feeder 320. As a result, due to the feeder 320, the strength of the total magnetic field increases in the center of the resonator 310 having the loop structure, and decreases near an outer periphery of the resonator 310, thereby compensating for the normal characteristic of the resonator 310 having the loop structure in which the strength of the magnetic field decreases in the center of the resonator 310, and increases near the outer periphery of the resonator 310. Thus, the strength of the total magnetic field may be constant inside the resonator 310.

A wireless power transmission efficiency of transmitting power from a source resonator to a target resonator is proportional to the strength of the total magnetic field generated in the source resonator. In other words, when the strength of the total magnetic field increases in the center of the source resonator, the wireless power transmission efficiency also increases.

Figure 4B:
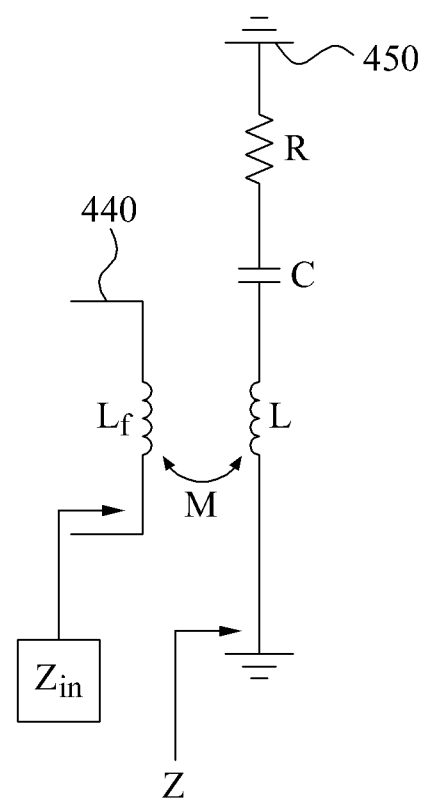
FIG. 4B illustrates examples of equivalent circuits of a feeder and a resonator.

FIG. 4B illustrates an example of equivalent circuits of a feeder and a resonator.

Referring to FIG. 4B, a feeder 440 and a resonator 450 may be represented by the equivalent circuits in FIG. 4B. The feeder 440 is represented as an inductor having an inductance $L_f$, and the resonator 450 is represented as a series connection of an inductor having an inductance L coupled to the inductance $L_f$ of the feeder 440 by a mutual inductance M, a capacitor having a capacitance C, and a resistor having a resistance R. An example of an input impedance $Z_{in}$ viewed in a direction from the feeder 440 to the resonator 450 may be expressed by the following Equation 4.

$$Z_{in} = \frac{(\omega M)^2}{Z} \quad (4)$$

In Equation 4, M denotes a mutual inductance between the feeder 440 and the resonator 450, ω denotes a resonant frequency between the feeder 440 and the resonator 450, and Z denotes an impedance viewed in a direction from the resonator 450 to a target.

As can be seen from Equation 4, the input impedance $Z_{in}$ is proportional to the square of the mutual inductance M. Accordingly, the input impedance $Z_{in}$ may be adjusted by adjusting the mutual inductance M between the feeder 440 and the resonator 450. The mutual inductance M depends on an area of a region between the feeder 440 and the resonator 450. The area of the region between the feeder 440 and the resonator 450 may be adjusted by adjusting a size of the feeder 440, thereby adjusting the mutual impedance M and the input impedance $Z_{in}$. Since the input impedance $Z_{in}$ may be adjusted by adjusting the size of the feeder 440, and it may be unnecessary to use a separate matching network to perform impedance matching with an output impedance of a power amplifier.

If the resonator 450 and the feeder 440 are included in a wireless power receiver, a magnetic field may be distributed as illustrated in FIG. 4A. The resonator 450 may operate as a target resonator 450. For example, the target resonator 450 may receive wireless power from a source resonator via magnetic coupling with the source resonator. The received wireless power induces a current in the target resonator 450. The induced current in the target resonator 450 generates a magnetic field, which induces a current in the feeder 440. If the target resonator 450 is connected to the feeder 440 as illustrated in FIG. 4A, the induced current in the target resonator 450 will flow in the same direction as the induced current in the feeder 440. Accordingly, for the reasons discussed above, the strength of the total magnetic field will increase inside the feeder 440, but will decrease in a region between the feeder 440 and the target resonator 450.

Figure 5:
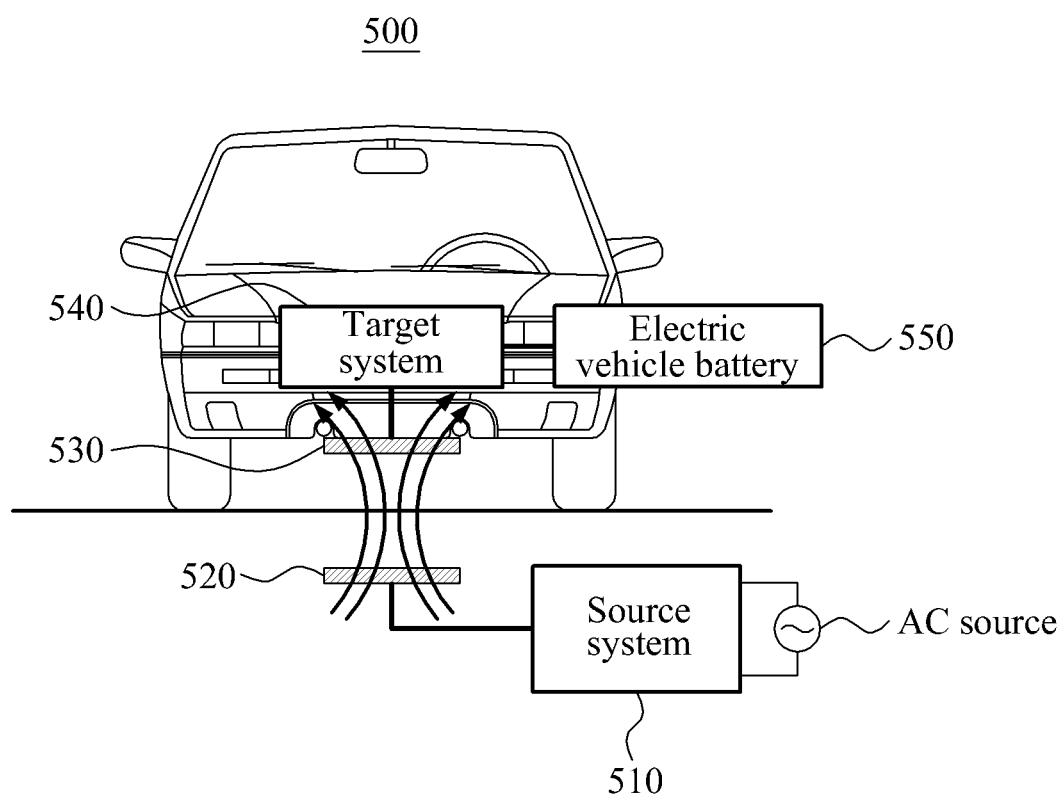
FIG. 5 illustrates an example of an electric vehicle charging system.

FIG. 5 illustrates an example of an electric vehicle charging system.

Referring to FIG. 5, an electric vehicle charging system 500 includes a source system 510, a source resonator 520, a target resonator 530, a target system 540, and an electric vehicle battery 550.

The electric vehicle charging system 500 may have a structure similar to the structure of the wireless power transmission system of FIG. 1. The source system 510 and the source resonator 520 in the electric vehicle charging system 500 operate as a source. Additionally, the target resonator 530 and the target system 540 in the electric vehicle charging system 500 operate as a target.

In one example, the source system 510 includes a variable SMPS, a power amplifier, a matching network, a TX controller, a communication unit, and a power detector similar to those of the source 110 of FIG. 1. In one example, the target system 540 includes a matching network, a rectifier, a DC/DC converter, a communication unit, an RX controller, a voltage detector, and a power detector similar to those of the target 120 of FIG. 1.

The electric vehicle battery 550 is charged by the target system 540.

The electric vehicle charging system 500 may use a resonant frequency in a band of a few kilohertz (kHz) to tens of MHz.

The source system 510 generates power based on a type of the electric vehicle being charged, a capacity of the electric vehicle battery 550, and a charging state of the electric vehicle battery 550, and wirelessly transmits the generated power to the target system 540 via magnetic coupling between the source resonator 520 and the target resonator 530.

The source system 510 may control an alignment of the source resonator 520 and the target resonator 530. For example, when the source resonator 520 and the target resonator 530 are not aligned with each other, the TX controller of the source system 510 may transmit a message to the target system 540 to control the alignment of the source resonator 520 and the target resonator 530.

For example, when the target resonator 530 is not located in a position enabling maximum magnetic coupling, the source resonator 520 and the target resonator 530 are not properly aligned with each other. When an electric vehicle does not stop at a proper position to accurately the source resonator 520 and the target resonator 530 with each other, the source system 510 may instruct a position of the electric vehicle to be adjusted to control the source resonator 520 and the target resonator 530 to be aligned with each other. However, this is merely an example, and other methods of aligning the source resonator 520 and the target resonator 530 with each other may be used.

The source system 510 and the target system 540 may transmit and receive an ID of an electric vehicle and exchange various messages by communicating with each other.

The descriptions of FIG. 1 through 4B are also applicable to the electric vehicle charging system 500. However, the electric vehicle charging system 500 may use a resonant frequency in a band of a few kHz to tens of MHz, and may transmit power that is equal to or higher than tens of watts to charge the electric vehicle battery 550.

FIGS. 6A, 6B, 7A, and 7B illustrate examples of applications using a wireless power receiver and a wireless power transmitter.

Figure 6A:
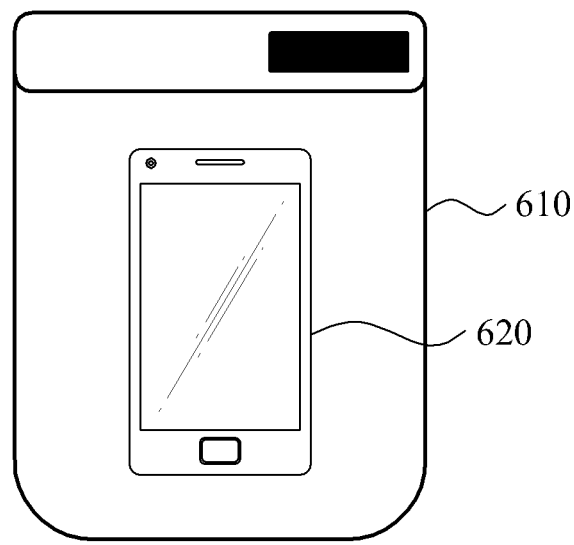
FIGS. 6A, 6B, 7A, and 7B illustrate examples of applications using a wireless power receiver and a wireless power transmitter.
Figure 6B:
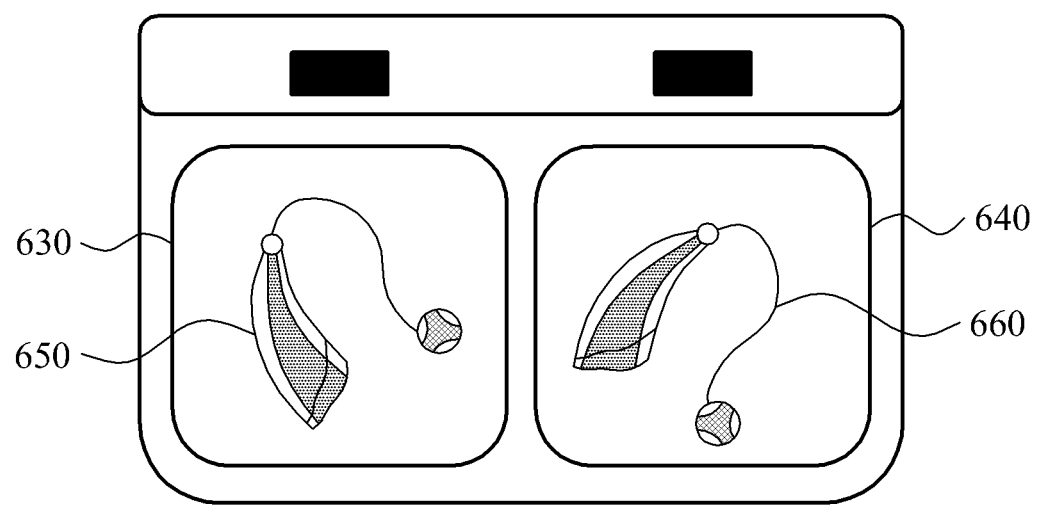

FIG. 6A illustrates an example of wireless power charging between a pad 610 and a mobile terminal 620, and FIG. 6B illustrates an example of wireless power charging between pads 630 and 640 and hearing aids 650 and 660.

In the example in FIG. 6A, a wireless power transmitter is mounted in the pad 610, and a wireless power receiver is mounted in the mobile terminal 620. The pad 610 is used to charge a single mobile terminal, namely the mobile terminal 620.

In the example in FIG. 6B, two wireless power transmitters are respectively mounted in the pads 630 and 640. The hearing aids 650 and 660 may be used for a left ear and a right ear, respectively. In this example, two wireless power receivers are respectively mounted in the hearing aids 650 and 660.

Figure 7A:
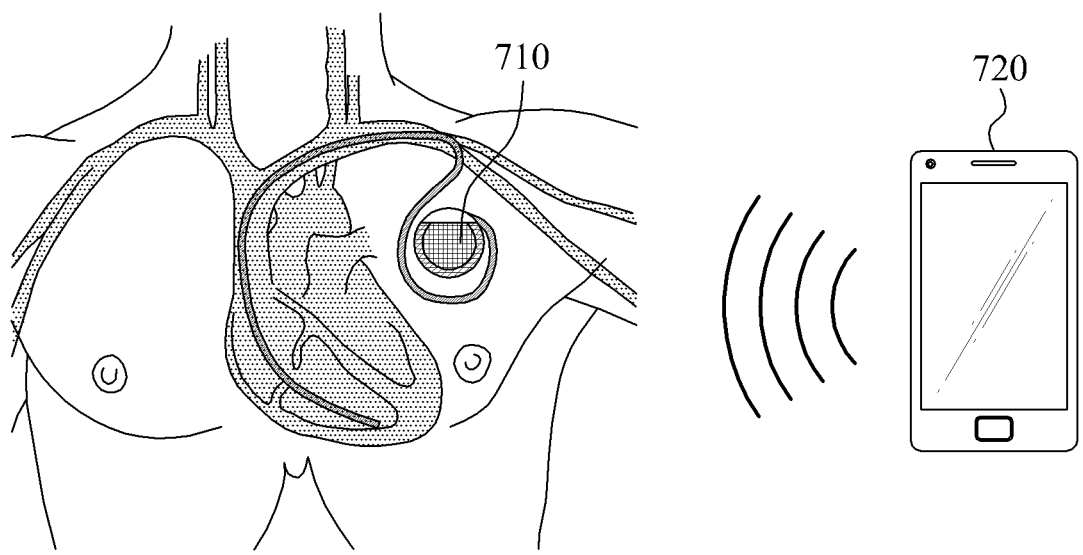
Figure 7B:
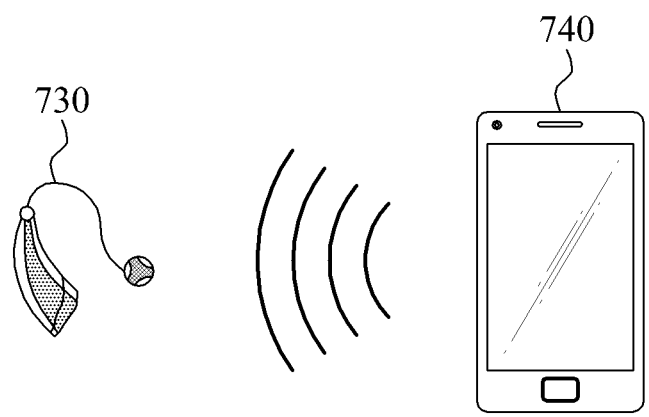

FIG. 7A illustrates an example of wireless power charging between an electronic device 710 that is implanted into a human body and a mobile terminal 720. FIG. 7B illustrates an example of wireless power charging between a hearing aid 730 and a mobile terminal 740.

In the example in FIG. 7A, a wireless power transmitter and a wireless power receiver are mounted in the mobile terminal 720, and a wireless power receiver is mounted in the electronic device 710 implanted in the human body. The electronic device 710 is charged by receiving power from the mobile terminal 720.

In the example in FIG. 7B, a wireless power transmitter and a wireless power receiver are mounted in the mobile terminal 740, and a wireless power receiver is mounted in the hearing aid 730. The hearing aid 730 is charged by receiving power from the mobile terminal 740. Low-power electronic devices, such as Bluetooth earphones, may also be charged by receiving power from the mobile terminal 740.

Figure 8:
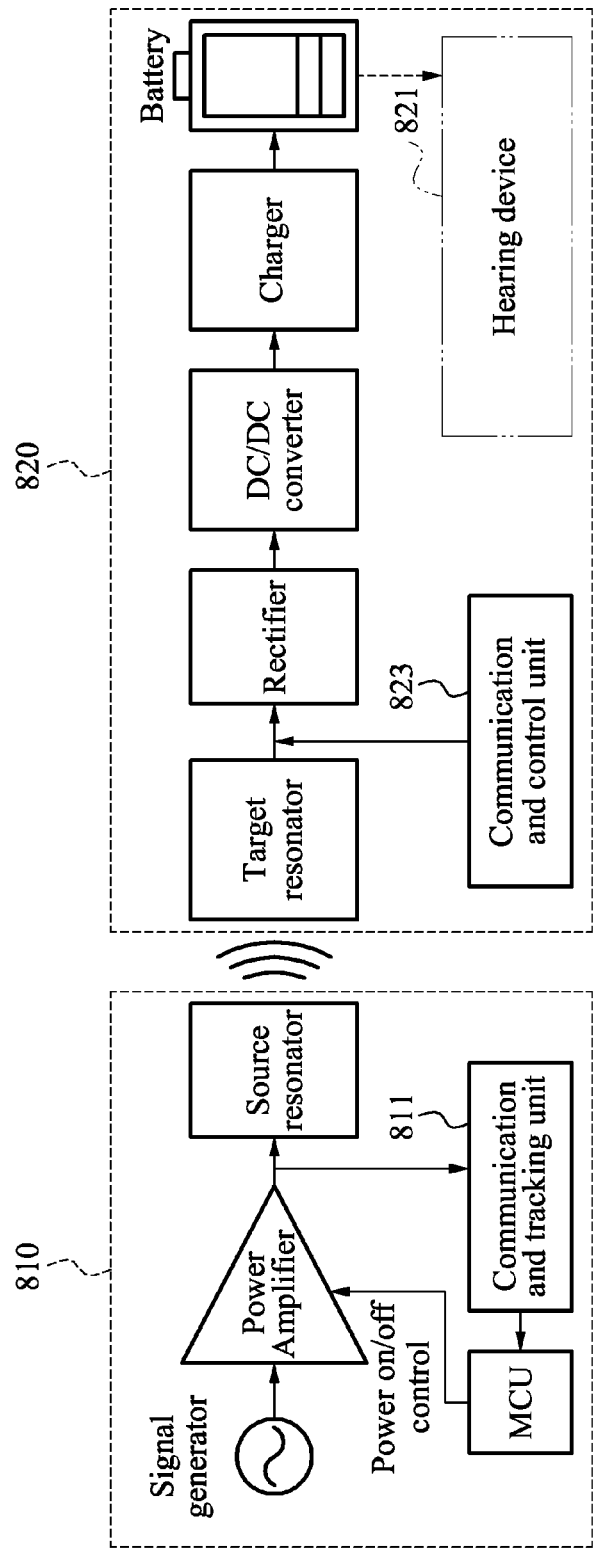
FIG. 8 illustrates an example of a wireless power receiver and a wireless power transmitter.

FIG. 8 illustrates an example of a wireless power transmitter and a wireless power receiver.

A wireless power transmitter 810 of FIG. 8 may be mounted in the pad 610 of FIG. 6A, the pads 630 and 640 of FIG. 6B, the mobile terminal 720 of FIG. 7A, and the mobile terminal 740 of FIG. 7B.

A wireless power receiver 820 of FIG. 8 may be mounted in the mobile terminal 620 of FIG. 6A, the hearing aids 650 and 660 of FIG. 6B, the electronic device 710 and the mobile terminal 720 of FIG. 7A, and the mobile terminal 740 of FIG. 7B.

The wireless power transmitter 810 has a configuration similar to the configuration of the source 110 of FIG. 1. For example, the wireless power transmitter 810 may include a unit configured to transmit power via magnetic coupling.

As illustrated in FIG. 8, the wireless power transmitter 810 includes a signal generator, a power amplifier, a communication and tracking unit 811, a micro control unit (MCU), and a source resonator. The signal generator generates a signal having a resonant frequency of the source resonator. The communication and tracking unit 811 communicates with the wireless power receiver 820, and controls an input impedance and a resonant frequency to maintain a wireless power transmission efficiency. The communication and tracking unit 811 and the MCU may perform functions similar to the functions performed by the communication unit 115 and the TX controller 114 of FIG. 1.

The wireless power receiver 820 has a configuration similar to the configuration of the target 120 of FIG. 1. For example, the wireless power receiver 820 may include a unit configured to wirelessly receive power and charge a battery with the received power.

As illustrated in FIG. 8, wireless power receiver 820 includes a target resonator, a rectifier, a DC/DC converter, and a charger, a battery, and a communication and control unit 823.

The communication and control unit 823 communicates with the wireless power transmitter 810, and performs an operation to protect a device powered by the wireless power receiver 820 from overvoltage and overcurrent.

The wireless power receiver 820 may include a hearing device 821. The hearing device 821 may be powered by the battery. The hearing device 821 may include a microphone, an analog-to-digital converter (ADC), a processor, a digitalto-analog converter (DAC), and a receiver. In particular, the hearing device 821 may have the same configuration as a hearing aid.

Hereinafter, the source resonator will be referred to as a transmission resonator, and the target resonator will be referred to as a reception resonator.

Figure 9:
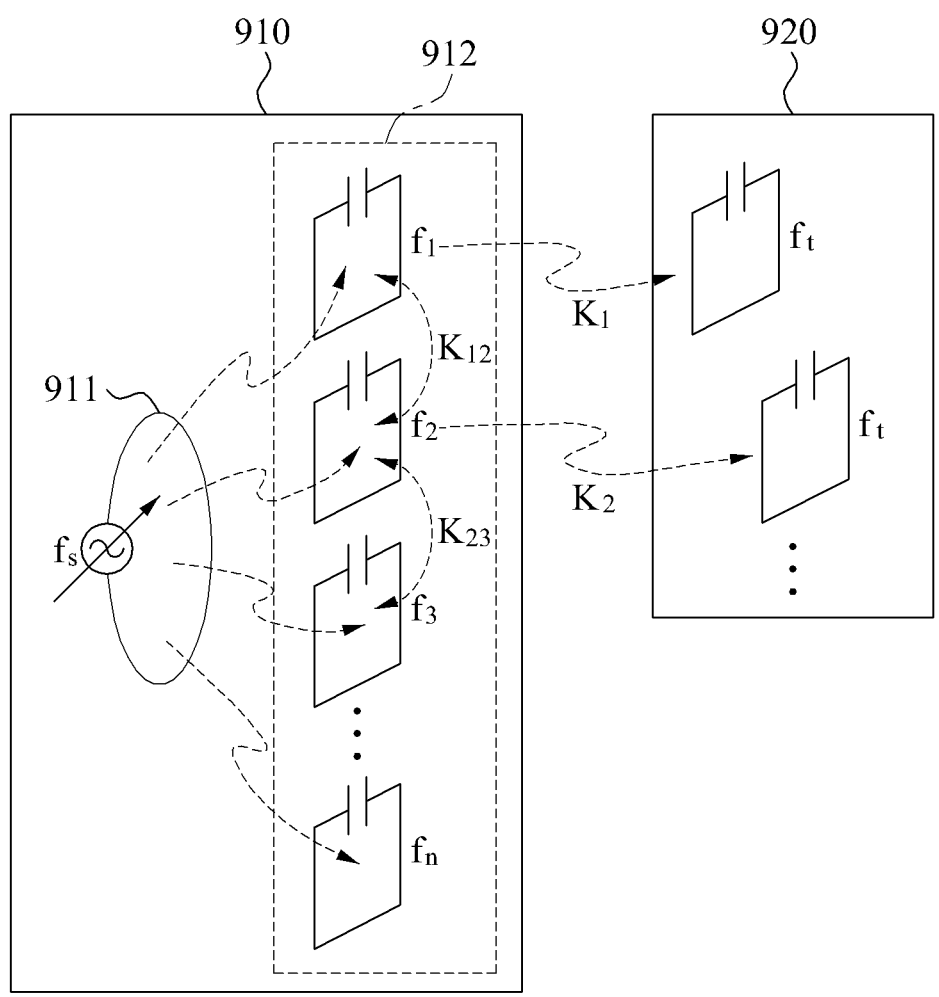
FIG. 9 illustrates an example of a wireless power transmission system including a wireless power transmitter including a feeder and a plurality of transmission resonators, and a wireless power receiver including a plurality of reception resonators.
Figure 10:
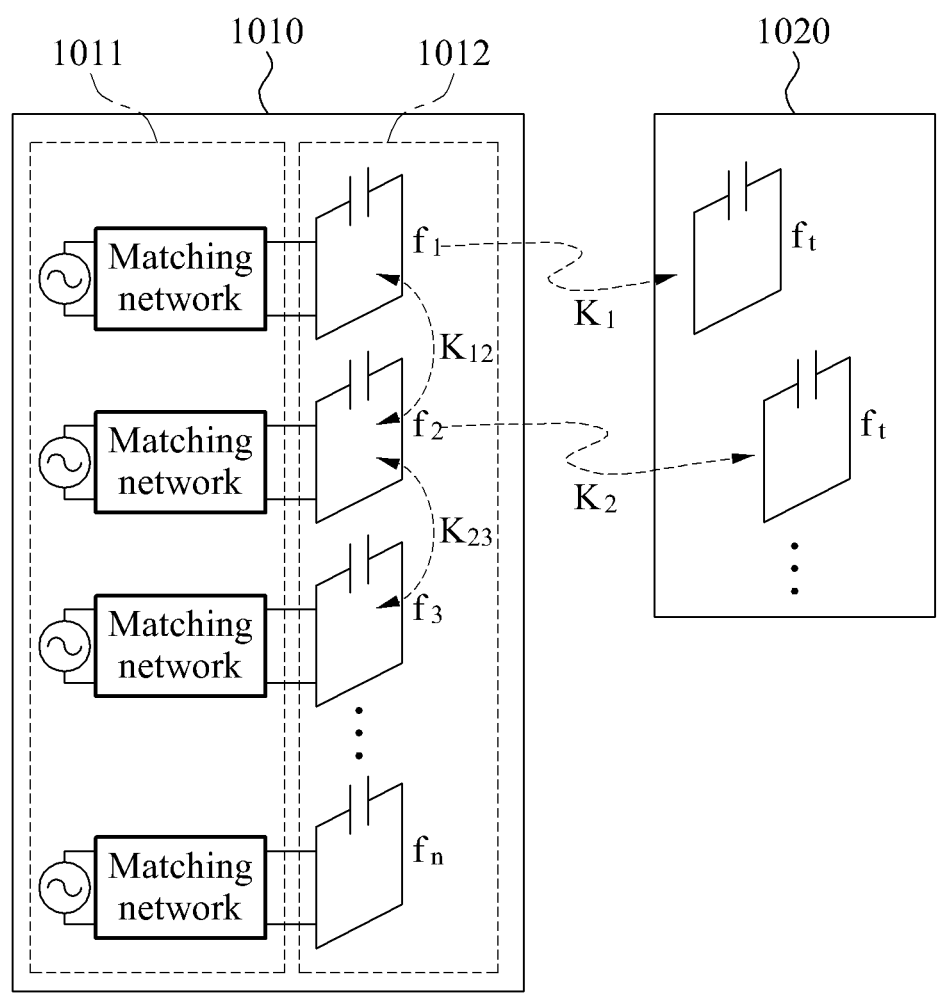
FIG. 10 illustrates an example of a wireless power transmission system including a wireless power transmitter in which a plurality of feeders are respectively connected to a plurality of transmission resonators, and a wireless power receiver including a plurality of reception resonators.

FIG. 9 illustrates an example of a wireless power transmission system including a wireless power transmitter 910 including a feeder 911 and a plurality of transmission resonators 912, and a wireless power receiver 920 including a plurality of reception resonators. FIG. 10 illustrates an example of a wireless power transmission system including a wireless power transmitter 1010 in which a plurality of feeders 1011 are respectively connected to a plurality of transmission resonators 1012, and a wireless power receiver 1020 including a plurality of reception resonators.

With a development of information technology (IT), various portable electronic devices have been released, and a number of terminals owned and carried by each individual is likely to increase. Since these portable electronic devices have become diverse and complex, an issue of charging the portable electronic devices has arisen. In addition, although wireless data transmission for home appliances has been implemented, use of a power cable is required due to power requirements.

In light of this, wireless power transmission technology may be needed to supply power without a power cable. The wireless power transmission technology may enable easier supply of power compared to a currently used wired charging system. By using the wireless power transmission technology, power may be shared between devices without an internal power source and a power cable. In addition, environmental pollution caused by the internal power source, for example, used batteries, may be prevented.

Referring to FIG. 9, by using wireless power transmission, a plurality of wireless power receivers 920 may be charged simultaneously using a single wireless power transmitter 910. The plurality of wireless power receivers 920 may include, for example, a number of devices and various types of devices. For stable power supply despite a change in a location of a wireless power receiver 920 and a change in a distance from the wireless power receiver 920, the wireless power transmitter 910 includes the plurality of transmission resonators 912. In this example, strong coupling may occur between adjacent ones of the transmission resonators 912. Similar to an array antenna, the plurality of transmission resonators 912 may have a reduced isolation due to the strong coupling between the adjacent ones of the transmission resonators 912. The plurality of transmission resonators 912 having a reduced isolation with respect to the adjacent ones of the transmission resonators 912 may not be able to perform stable power transmission to the wireless power receiver 920.

As described above, FIG. 9 illustrates the wireless power transmission system including the wireless power transmitter 910 including the plurality of transmission resonators 912, and the wireless power receiver 920 including the plurality of reception resonators. For example, resonant frequencies of the transmission resonators 912 may be represented by $f_1, f_2, f_3, \ldots, f_n$. The resonant frequencies may be the same as or different from one another. Resonant frequencies of the reception resonators may be represented by $f_r$.

A feeder 911 may have various configurations, for example, N configurations corresponding to N transmission resonators 912. In this example, N is an integer greater than or equal to 1. For example, a single feeder 911 may be provided as shown in FIG. 9, or a plurality of feeders 1011 may be provided as shown in FIG. 10. The feeder 911 injects power having an operating frequency $f_s$ into the transmission resonators 912. The feeder 911 may include the matching network 113 of FIG. 1.

In general, strong resonance coupling may occur between adjacent ones of the transmission resonators 912. In FIG. 9, $K_{12}$ and $K_{23}$ denote strengths of resonance coupling occurring between the adjacent ones of the transmission resonators 912. As the strengths of resonance coupling increase, the isolation between the adjacent ones of the transmission resonators 912 decreases.

The strengths $K_{12}$ and $K_{23}$ of the resonance coupling between the adjacent ones of the transmission resonators 912 may be much greater than strengths $K_1$ and $K_2$ of resonance coupling between the transmission resonators 912 and reception resonators of the wireless power receiver 920. When the isolation decreases due to the increase in the strengths of resonance coupling between the adjacent ones of the transmission resonators 912, each of the plurality of transmission resonators 912 may not be able to operate independently by generating a magnetic field that is not influenced by any other magnetic field generated by any other one of the plurality of transmission resonators 912. Thus, the plurality of transmission resonators 912 having a relatively low isolation may not be able to perform stable power transmission to the reception resonators.

Unless the problem of low isolation is resolved, an amount of dissipated within the wireless power transmitter 910 due to the resonance coupling between the adjacent ones of the transmission resonators 912 may be greater than an amount of power transmitted to the wireless power receiver 920. Thus, when power is dissipated in the wireless power transmitter 910, a wireless power transmission efficiency may decrease, and it may be difficult to transmit power to a desired wireless power receiver 920.

The above description provided with reference to FIG. 9 is also applicable to FIG. 10, and thus a duplicated description will be omitted for conciseness.

By using the examples of structures and arrangements of FIGS. 11 through 14, an isolation of a plurality of resonators may be increased. Also, by using the examples of operating frequency control and arrangements of FIGS. 15 through 18, an isolation of a plurality of resonators may be increased. In these examples, a resonator may be a transmission resonator or a reception resonator.

Figure 11:
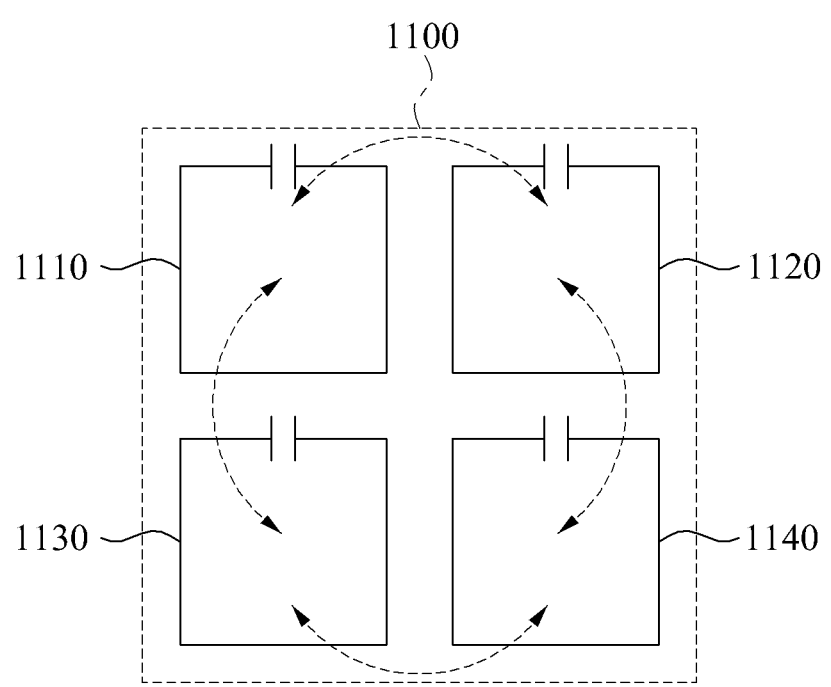
FIG. 11 illustrates an example of a structure in which each of a plurality of transmission resonators is strongly coupled to adjacent ones of the plurality of transmission resonators.

FIG. 11 illustrates an example of a structure in which each of a plurality of transmission resonators 1110, 1120, 1130, and 1140 is strongly coupled to adjacent ones of the plurality of transmission resonators 1110, 1120, 1130, and 1140. In this example, an overall wireless power transmission efficiency of a wireless power transmission system decreases. By using the examples of structures and arrangements of FIGS. 12 through 14, an isolation among the plurality of resonators 1110, 1120, 1130, and 1140 in a resonating apparatus 1100 may be increased. The plurality of resonators 1110, 1120, 1130, and 1140 may be transmission resonators or reception resonators included in the resonating apparatus 1100, which may be a transmission resonating apparatus or a reception resonating apparatus.

Figure 12:
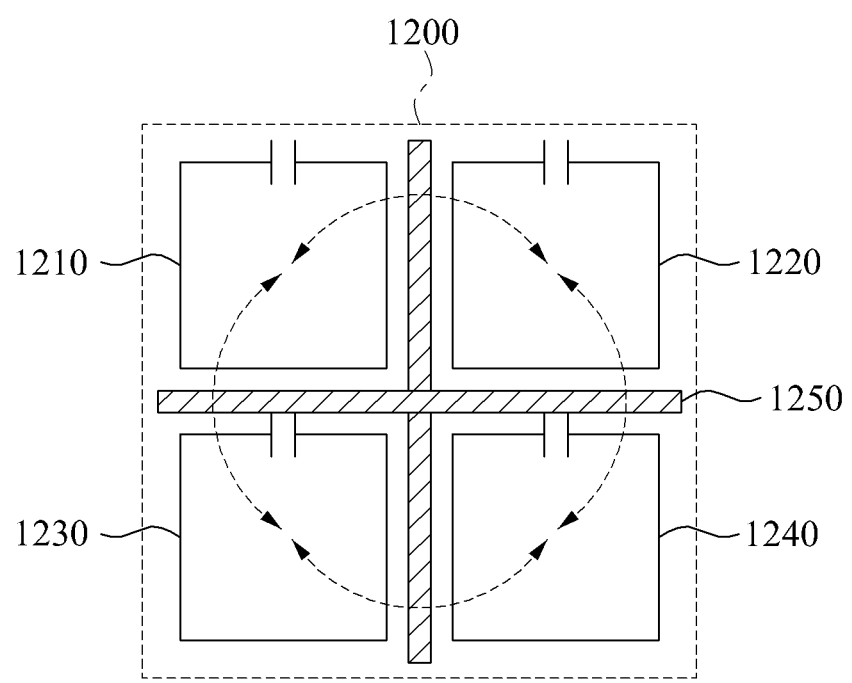
FIG. 12 illustrates an example of a structure in which a plurality of resonators are weakly coupled to each other through either one or both of a magnetic material and a conductor.
Figure 13A:
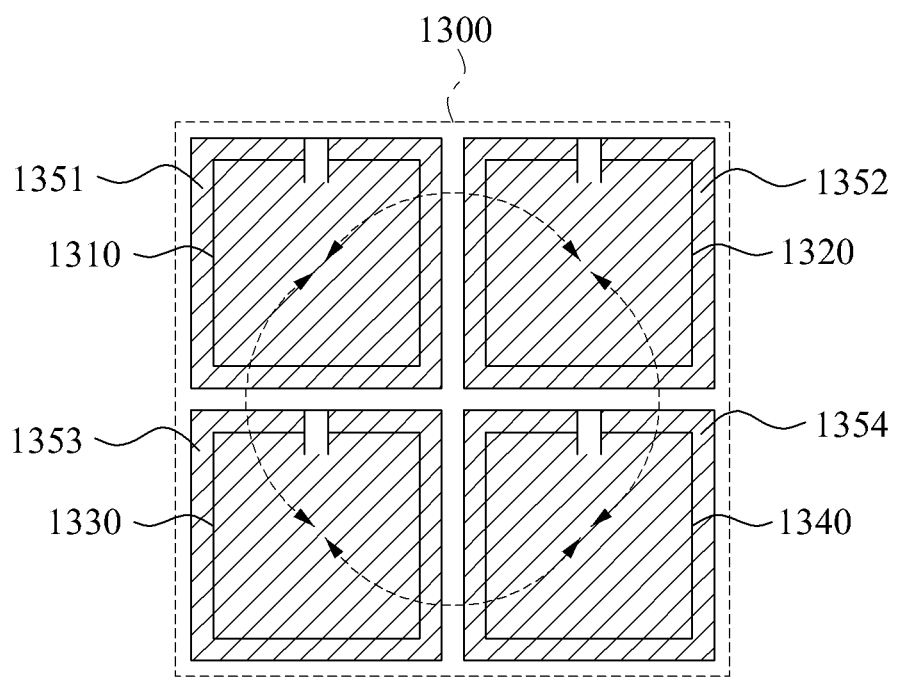
FIGS. 13A and 13B illustrate another example of a structure in which a plurality of resonators are weakly coupled to each other through either one or both of a magnetic material and a conductor.
Figure 13B:
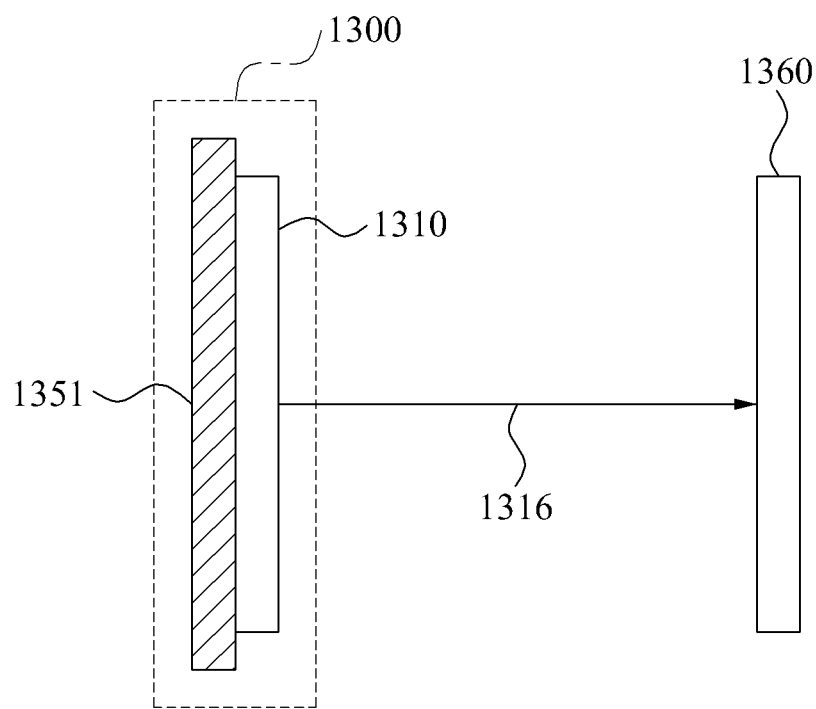

FIG. 12 illustrates an example of a structure in which a plurality of resonators 1210, 1220, 1230, and 1240 are weakly coupled to each other through either one or both of a magnetic material and a conductor, and FIGS. 13A and 13B illustrate another example of a structure in which a plurality of resonators 1310, 1320, 1330, and 1340 are weakly coupled to each other through either one or both of a magnetic material and a conductor. The either one or both of a magnetic material and a conductor constitute an isolating material that reduces resonance coupling between adjacent resonators of the plurality of resonators, thereby increasing an isolation between the adjacent resonators. The isolating material may eliminate resonance coupling between the adjacent resonators, thereby isolating each of the plurality of resonators from a magnetic field generated by every other one of the plurality of resonators, and enabling each of the plurality of resonators to generate a magnetic field independently without being influenced by any other magnetic field generated by any other resonator.

A resonating apparatus 1200 including the plurality of resonators 1210, 1220, 1230, and 1240 and a resonating apparatus 1300 including the plurality of resonators 1310, 1320, 1330, and 1340 may be applicable to an apparatus including a battery, for example, a portable electronic device, and an apparatus not including a battery and thus requiring wireless power supply in homes, offices, and factories. The resonating apparatuses 1200 and 1300 may be transmission resonating apparatuses or reception resonating apparatuses.

FIG. 12 illustrates an example of a structure in which a material 1250 that reduces resonance coupling between the plurality of resonators 1210, 1220, 1230, and 1240 is inserted in a space between adjacent resonators among the plurality of resonators 1210, 1220, 1230, and 1240. The material 1250 may include either one or both of a magnetic material and a conductor. The magnetic material may include, for example, ferrite.

By disposing the material 1250 including either one or both of the magnetic material and the conductor in the space between the adjacent resonators among the plurality of resonators 1210, 1220, 1230, and 1240, an effect of a magnetic field generated by the adjacent resonators on wireless power transmission may be decreased. The material 1250 may be inserted in a space between each of the plurality of resonators 1210, 1220, 1230, and 1240 and each one of the plurality of resonators 1210, 1220, 1230, and 1240 that is adjacent to each of the plurality of resonators 1210, 1220, 1230, and 1240.

For example, the material 1250 may be disposed in a space between the first resonator 1210 and the second resonator 1220, in a space between the second resonator 1220 and the fourth resonator 1240, in a space between the third resonator 1230 and the fourth resonator 1240, and in a space between the first resonator 1210 and the third resonator 1230.

When mutual effects of magnetic fields on the plurality of resonators 1210, 1220, 1230, and 1240 decrease, a strength of resonance coupling will decrease, and thus an isolation of the plurality of resonators 1210, 1220, 1230, and 1240 included in the resonating apparatus 1200 will increase.

FIGS. 13A and 13B illustrate an example of a structure in which a material that reduces resonance coupling among the plurality of resonators 1310, 1320, 1330, and 1340 is inserted on planes 1351, 1352, 1353, and 1354 opposite to directions in which the plurality of resonators 1310, 1320, 1330, and 1340 resonate. The material may include either one or both of a magnetic material and a conductor. The magnetic material may include, for example, ferrite.

In the example in FIG. 13A, the material is disposed separately for each of the plurality of resonators 1310, 1320, 1330, and 1340. The material is disposed on the plane 1351 opposite to a resonance direction of the first resonator 1310, on the plane 1352 opposite to a resonance direction of the second resonator 1320, on the plane 1353 opposite to a resonance direction of the third resonator 1330, and on the plane 1354 opposite to a resonance direction of the fourth resonator 1340.

Referring to FIG. 13B, the plurality of resonators 1310, 1320, 1330, and 1340 resonate in a direction 1316. When the first resonator 1310 is a transmission resonator, the first resonator 1310 resonates with a reception resonator 1360 in the direction 1316 for wireless power transmission. The reception resonator 1360 receives power wirelessly from the first resonator 1310. In this example, the material is disposed on the plane 1351 opposite to the direction 1316 in which the first resonator 1310 resonates to transmit power wirelessly to the reception resonator 1360.

In another example, in a case where the reception resonator 1360 is one of a plurality of reception resonators, the material may be disposed on a plane (not shown) opposite to a direction in which the resonator 1360 resonates to receive power wirelessly from the first resonator 1310.

Figure 14:
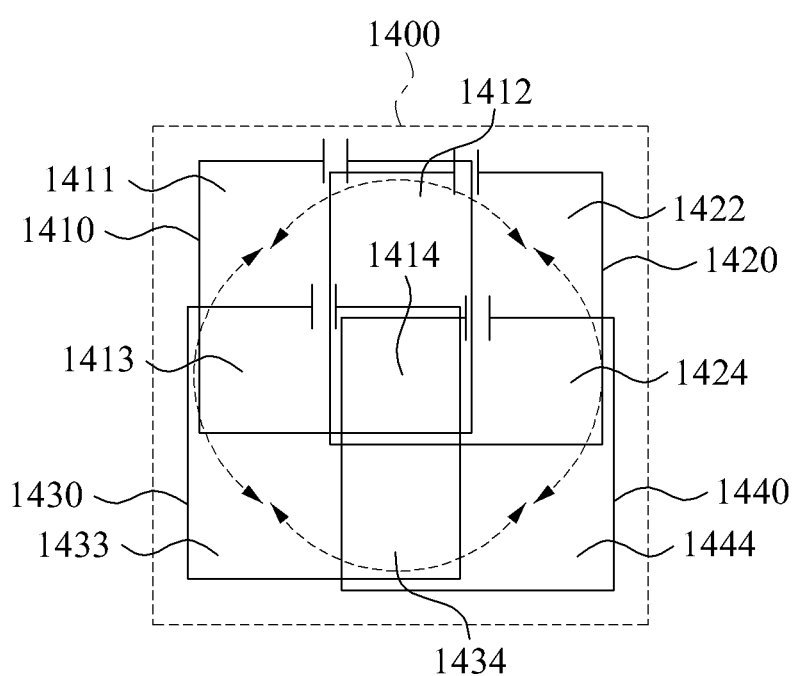
FIG. 14 illustrates an example of a structure in which resonators in a plurality of overlapping resonators are weakly coupled to each other.

FIG. 14 illustrates an example of a structure in which resonators in a plurality of overlapping resonators 1410, 1420, 1430, and 1440 are weakly coupled to each other.

By overlapping a resonator and a portion of an adjacent resonator, a strength of resonance coupling between the resonator and the adjacent resonator may be reduced based on a characteristic that a direction of a magnetic field inside a conducting wire is opposite to a direction of a magnetic field outside the conducting wire.

The plurality of resonators 1410, 1420, 1430, and 1440 are disposed to provide reduced resonance coupling between each of the plurality of resonators 1410, 1420, 1430, and 1440 and an adjacent resonator based on a characteristic that a direction of a magnetic field of an overlapping area is opposite to a direction of a magnetic field of a non-overlapping area in each of the plurality of resonators 1410, 1420, 1430, and 1440. In this example, at least three resonators may be provided.

Referring to FIG. 14, at least one of the plurality of resonators 1410, 1420, 1430, and 1440 is disposed over an internal portion and an external portion of an adjacent resonator. In this example, a resonator may be divided into an area not overlapping the adjacent resonator, and an area overlapping the adjacent resonator.

For example, the first resonator 1410 includes an area 1411 not overlapping adjacent resonators, an area 1412 overlapping the second resonator 1420, an area 1413 overlapping the third resonator 1430, and an area 1414 overlapping the second resonator 1420, the third resonator 1430, and the fourth resonator 1440. The fourth resonator 1440 includes an area 1444 not overlapping adjacent resonators, an area 1414 overlapping the first resonator 1410, the second resonator 1420, and the third resonator 1430, an area 1424 overlapping the second resonator 1420, and an area 1434 overlapping the third resonator 1430. The second resonator 1420 includes an area 1422 not overlapping adjacent resonators, an area 1412 overlapping the first resonator 1410, an area 1414 overlapping the first resonator 1410, the third resonator 1430, and the fourth resonator 1440, and an area 1424 overlapping the fourth resonator 1440. The third resonator 1430 includes an area 1433 not overlapping adjacent resonators, an area 1413 overlapping the first resonator 1410, an area 1414 overlapping the first resonator 1410, the second resonator 1420, and the fourth resonator 1440, and an area 1434 overlapping the fourth resonator 1440.

In this example, mutual fluxes between two adjacent resonators may be expressed by the following Equation 5.

$$\Phi = \mu \int_S \overline{H}_{in} \cdot d\overline{S} + \mu \int_S \overline{H}_{out} \cdot d\overline{S} \quad (5)$$

In Equation 5, Φ denotes a magnetic flux measured in webers (Wb), μ denotes a magnetic permeability measured in henries per meter (H/m), $\overline{H}_{in}$ and $\overline{H}_{out}$ denote a strength of a magnetic field in each resonator measured in amperes per meter (A/m), $\overline{S}$ denotes a surface through which the magnetic field passes, and $d\overline{S}$ denotes an infinitesimal element of the surface $\overline{S}$. $\overline{H}_{in}$ denotes a strength of a magnetic field in an area in which each resonator does not overlap an adjacent resonator, and $\overline{H}_{out}$ denotes a strength of a magnetic field in an area in which each resonator overlaps an adjacent resonator.

In Equation 5, directions of $\overline{H}_{in}$ and $\overline{H}_{out}$ are opposite to each other. In this example, when absolute values of integrals of the two fields $\overline{H}_{in}$ and $\overline{H}_{out}$ are equal to one another, mutual fluxes and coupling between the two resonators are zero, and thus isolation characteristics may be improved.

A resonating apparatus 1400 may be designed to minimize an H-field, for example, to minimize a surface integral value of a magnetic field, generated by a magnetic field $\overline{H}_{in}$ in an area in which each resonator does not overlap an adjacent resonator and a magnetic field $\overline{H}_{out}$ in an area in which each resonator overlaps an adjacent resonator. The resonating apparatus 1400 may be designed to enable mutual fluxes of adjacent resonators to have opposite directions and substantially equal values.

At least one of the plurality of resonators 1410, 1420, 1430, and 1440 may be divided into two areas having mutual fluxes in opposite directions, and absolute values of the mutual fluxes of the two areas may be equal to each other or within a predetermined range of each other.

Figure 15:
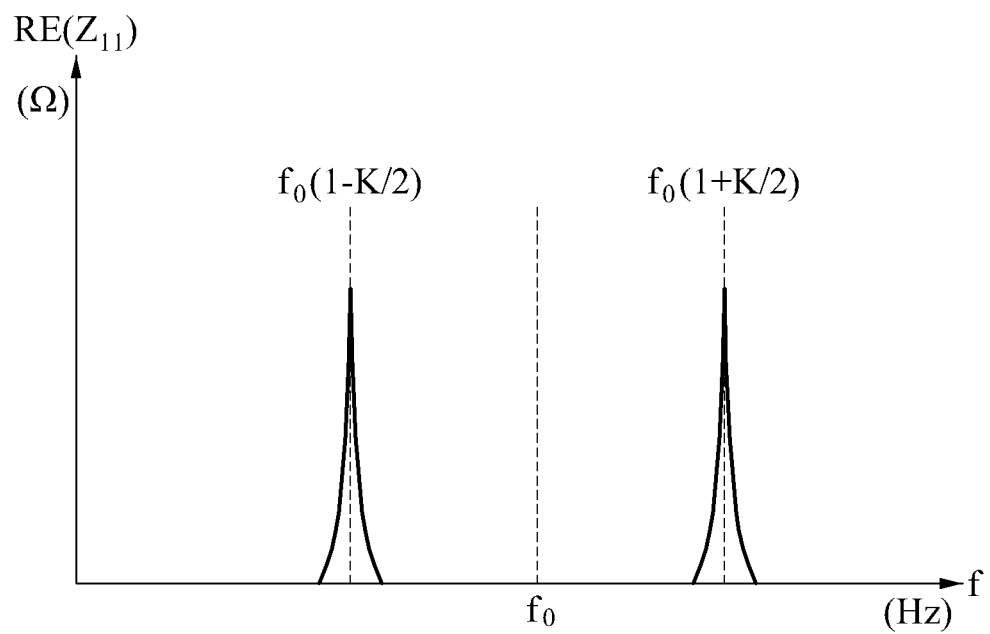
FIG. 15 illustrates an example of resonant modes generated by each of a plurality of transmission resonators and an adjacent transmission resonator.

FIG. 15 illustrates an example of resonant modes generated by each of a plurality of transmission resonators and an adjacent transmission resonator. An independent transmission resonator may have a unique resonant frequency, for example, $f_0$. However, when at least two transmission resonators are coupled to each other, each transmission resonator may form a resonant mode corresponding to an even mode or an odd mode.

The even mode is a resonant mode in which currents and magnetic fields generated between transmission resonators have the same directions. The odd mode is a resonant mode in which currents and magnetic fields generated between transmission resonators have opposite directions. For example, referring to FIG. 15, a resonant frequency corresponding to the even mode and a resonant frequency corresponding to the odd mode may be expressed by $f_0(1-K/2)$ and $f_0(1+K/2)$ based on a coupling coefficient K, wherein phases of $f_0(1-K/2)$ and $f_0(1+K/2)$ in the even mode are the same as each other, and phases of $f_0(1-K/2)$ and $f_0(1+K/2)$ in the odd mode are opposite to each other. Thus, by supplying power to a first transmission resonator at an operating frequency equal to or within a predetermined range of a frequency corresponding to the even mode, and supplying power to a second transmission resonator adjacent to the first transmission resonator at an operating frequency equal to or within a predetermined range of a frequency corresponding to the odd mode, resonance coupling between the first transmission resonator and the adjacent second transmission resonator may be decreased.

Figure 16:
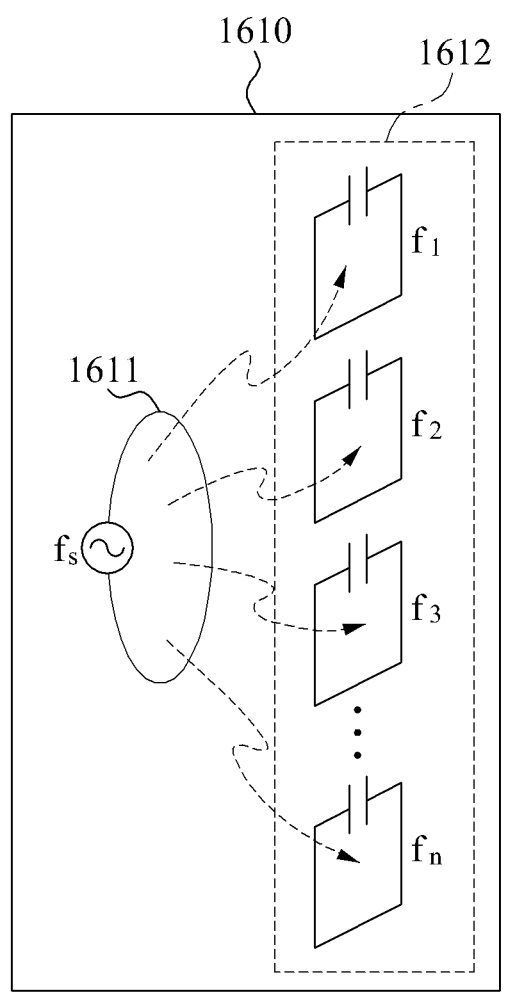
FIGS. 16 through 18 illustrate examples of methods of connecting a plurality of transmission resonators to a feeder.
Figure 17:
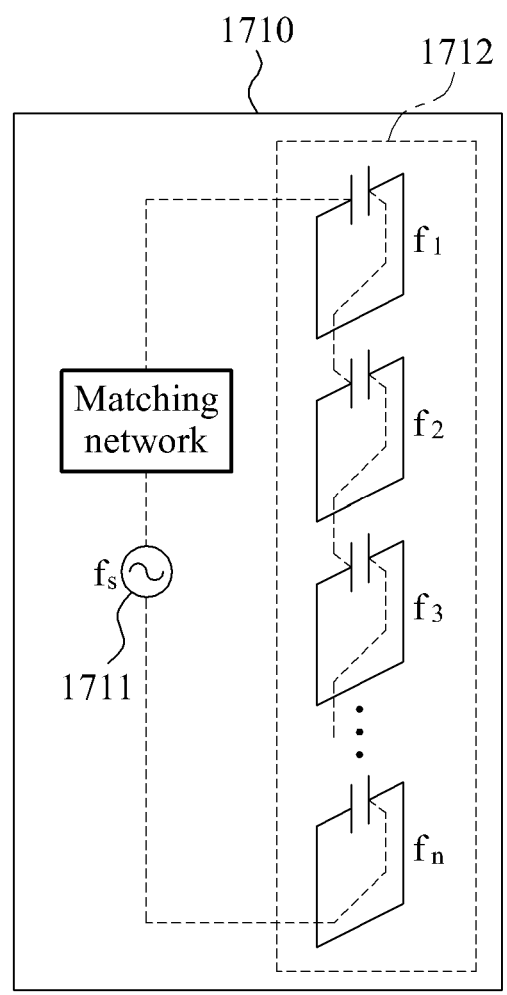
Figure 18:
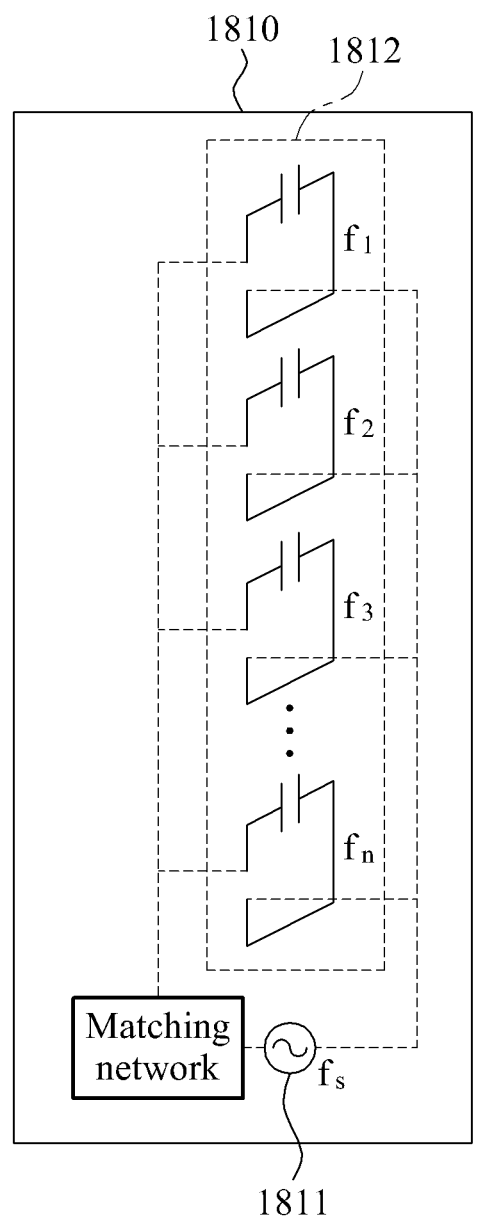

An operating frequency of a transmission resonating apparatus may be set using methods of connecting a plurality of resonators to a feeder as shown in FIGS. 16 through 18.

FIGS. 16 through 18 illustrate examples of methods of connecting a plurality of transmission resonators to a feeder. FIG. 16 illustrates an example of a transmission resonating apparatus 1610 including a plurality of transmission resonators 1612 to which an inductive coupling feeding method is applied, FIG. 17 illustrates an example of a series feeding method and a transmission resonating apparatus 1710 including a plurality of transmission resonators 1712 connected in parallel, and FIG. 18 illustrates an example of a parallel feeding method and a transmission resonating apparatus 1810 including a plurality of transmission resonators 1812 connected in series.

Referring to FIG. 16, a feeder 1611 injects power having a set operating frequency $f_s$ into the plurality of transmission resonators 1612 via inductive coupling. Referring to FIG. 17, the plurality of transmission resonators 1712 are connected in parallel with each other, and a feeder 1711 is connected in series with the plurality of transmission resonators 1712 to inject power having a set operating frequency $f_s$ into the plurality of transmission resonators 1712. Referring to FIG. 18, the plurality of transmission resonators 1812 are connected in series with each other, and a feeder 1811 is connected in parallel with the plurality of transmission resonators 1812 to inject power having a set operating frequency $f_s$ into the plurality of transmission resonators 1812.

Using the connecting methods of FIGS. 16 through 18, the operating frequency $f_s$ of the transmission resonating apparatuses 1610, 1710, and 1810 may be set to a frequency that differs from a frequency corresponding to one of the resonant modes described above by an amount that is less than or equal to a predetermined value, rather than being set to a unique resonant frequency, for example, $f_0$, of the transmission resonators 1612, 1712, and 1812.

When the resonant mode is an even mode, a difference between the operating frequency and a frequency corresponding to the even mode is set to be less than or equal to the predetermined value. When the resonant mode is an odd mode, a difference between the operating frequency and a frequency corresponding to the odd mode is set to be less than or equal to the predetermined value. For example, the operating frequency may be set to be within a range of ±5% of the frequency corresponding to the even mode or the odd mode.

Figure 19:
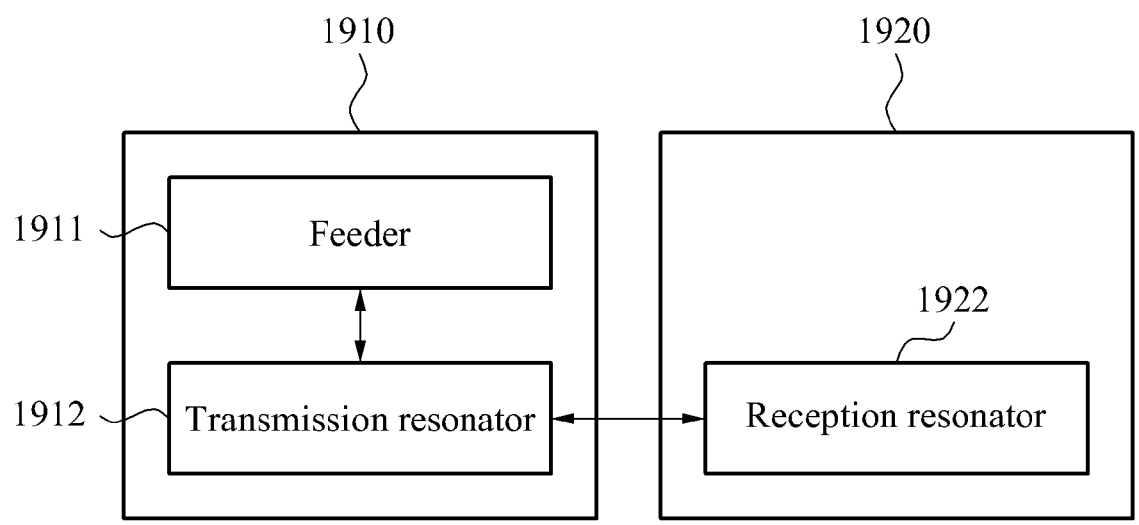
FIG. 19 illustrates an example of a configuration of a wireless power transmitter and a wireless power receiver.

FIG. 19 illustrates an example of a configuration of a wireless power transmitter and a wireless power receiver. The wireless power transmitter may be a transmission resonating apparatus 1910, and the wireless power receiver may be a reception resonating apparatus 1920.

Referring to FIG. 19, the transmission resonating apparatus 1910 includes a feeder 1911 and a plurality of transmission resonators 1912. The plurality of transmission resonators 1912 transmit power wirelessly via resonance coupling with a reception resonator 1922 included in the reception resonating apparatus 1920.

The plurality of transmission resonators 1912 may be disposed to be separated from each other on a same plane. The transmission resonating apparatus 1910 may be designed to provide reduced resonance coupling among the plurality of transmission resonators 1912 using a material that reduces the resonance coupling among the plurality of transmission resonators 1912. In another example, when a plurality of reception resonators 1922 is provided, the reception resonating apparatus 1920 may be designed so that a material that reduces resonance coupling among the plurality of reception resonators 1922 is disposed, similar to the plurality of transmission resonators 1912.

The plurality of transmission resonators 1912 may be disposed on a same plane. At least one of the plurality of transmission resonators 1912 may be disposed to overlap a portion of an area of an adjacent transmission resonator to provide reduced resonance coupling with the adjacent transmission resonator. In another example, when a plurality of reception resonators 1922 are provided, the reception resonating apparatus 1920 may be designed so that at least one of the plurality of reception resonators 1922 overlaps a portion of an area of an adjacent reception resonator to provide reduced resonance coupling with the adjacent reception resonator, similar to the plurality of transmission resonators 1912.

The plurality of transmission resonators 1912 may be disposed on a same plane, and each of the plurality of transmission resonators 1912 may form a resonant mode with an adjacent transmission resonator.

The feeder 1911 may inject power into the plurality of transmission resonators 1912 at an operating frequency set to provide reduced coupling between each of the plurality of transmission resonators 1912 and an adjacent transmission resonator based on a resonant mode. A difference between the operating frequency and a frequency corresponding to the resonant mode may be set to be minimized. The difference between the operating frequency and the frequency corresponding to the resonant mode may be set to be less than or equal to a predetermined value, for example, within a range of ±5%.

According to the examples described above, an isolation of a transmission resonating apparatus including a plurality of transmission resonators and an isolation of a reception resonating apparatus including a plurality of reception resonators may increase. The increase in the isolation may enable each resonator to generate a magnetic field independently without being influenced by any other magnetic field generated by any other resonator.

The TX controller 114, the communication units 115 and 124, and the RX controller 125 in FIG. 1 and the MCU, the communication and tracking unit 811, and the communication and control unit 823 in FIG. 8 that perform the various operations described with respect to FIGS. 1 through 8 may be implemented using one or more hardware components, one or more software components, or a combination of one or more hardware components and one or more software components.

A hardware component may be, for example, a physical device that physically performs one or more operations, but is not limited thereto. Examples of hardware components include resistors, capacitors, inductors, power supplies, frequency generators, operational amplifiers, power amplifiers, low-pass filters, high-pass filters, band-pass filters, analog-to-digital converters, digital-to-analog converters, and processing devices.

A software component may be implemented, for example, by a processing device controlled by software or instructions to perform one or more operations, but is not limited thereto. A computer, controller, or other control device may cause the processing device to run the software or execute the instructions. One software component may be implemented by one processing device, or two or more software components may be implemented by one processing device, or one software component may be implemented by two or more processing devices, or two or more software components may be implemented by two or more processing devices.

A processing device may be implemented using one or more general-purpose or special-purpose computers, such as, for example, a processor, a controller and an arithmetic logic unit, a digital signal processor, a microcomputer, a field-programmable array, a programmable logic unit, a microprocessor, or any other device capable of running software or executing instructions. The processing device may run an operating system (OS), and may run one or more software applications that operate under the OS. The processing device may access, store, manipulate, process, and create data when running the software or executing the instructions. For simplicity, the singular term "processing device" may be used in the description, but one of ordinary skill in the art will appreciate that a processing device may include multiple processing elements and multiple types of processing elements. For example, a processing device may include one or more processors, or one or more processors and one or more controllers. In addition, different processing configurations are possible, such as parallel processors or multi-core processors.

A processing device configured to implement a software component to perform an operation A may include a processor programmed to run software or execute instructions to control the processor to perform operation A. In addition, a processing device configured to implement a software component to perform an operation A, an operation B, and an operation C may have various configurations, such as, for example, a processor configured to implement a software component to perform operations A, B, and C; a first processor configured to implement a software component to perform operation A, and a second processor configured to implement a software component to perform operations B and C; a first processor configured to implement a software component to perform operations A and B, and a second processor configured to implement a software component to perform operation C; a first processor configured to implement a software component to perform operation A, a second processor configured to implement a software component to perform operation B, and a third processor configured to implement a software component to perform operation C; a first processor configured to implement a software component to perform operations A, B, and C, and a second processor configured to implement a software component to perform operations A, B, and C, or any other configuration of one or more processors each implementing one or more of operations A, B, and C. Although these examples refer to three operations A, B, C, the number of operations that may implemented is not limited to three, but may be any number of operations required to achieve a desired result or perform a desired task.

Software or instructions for controlling a processing device to implement a software component may include a computer program, a piece of code, an instruction, or some combination thereof, for independently or collectively instructing or configuring the processing device to perform one or more desired operations. The software or instructions may include machine code that may be directly executed by the processing device, such as machine code produced by a compiler, and/or higher-level code that may be executed by the processing device using an interpreter. The software or instructions and any associated data, data files, and data structures may be embodied permanently or temporarily in any type of machine, component, physical or virtual equipment, computer storage medium or device, or a propagated signal wave capable of providing instructions or data to or being interpreted by the processing device. The software or instructions and any associated data, data files, and data structures also may be distributed over network-coupled computer systems so that the software or instructions and any associated data, data files, and data structures are stored and executed in a distributed fashion.

For example, the software or instructions and any associated data, data files, and data structures may be recorded, stored, or fixed in one or more non-transitory computer-readable storage media. A non-transitory computer-readable storage medium may be any data storage device that is capable of storing the software or instructions and any associated data, data files, and data structures so that they can be read by a computer system or processing device. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, or any other non-transitory computer-readable storage medium known to one of ordinary skill in the art.

Functional programs, codes, and code segments for implementing the examples disclosed herein can be easily constructed by a programmer skilled in the art to which the examples pertain based on the drawings and their corresponding descriptions as provided herein.

While this disclosure includes specific examples, it will be apparent to one of ordinary skill in the art that various changes in form and details may be made in these examples without departing from the spirit and scope of the claims and their equivalents. Suitable results may be achieved if the described techniques are performed in a different order and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A resonating apparatus for wireless power transmission, the resonating apparatus comprising:
   a plurality of resonators separated from each other on a same plane; and
   a material disposed between each of the plurality of resonators or disposed on a plane opposite to a direction in which the plurality of resonators are configured to resonate,
   wherein the material is disposed to decrease an effect of a magnetic field generated by adjacent resonators of the plurality of the resonators on wireless power transmission.

2. The resonating apparatus of claim 1, wherein the material comprises either one or both of a magnetic material and a conductor.

3. A resonating apparatus comprising:
   a plurality of resonators disposed on a same plane;
   wherein the plurality of resonators are disposed to overlap a portion of an adjacent resonator of the plurality of resonators to reduce resonance coupling with the adjacent resonator,
   wherein a first area overlapping adjacent resonators of the plurality of resonators and a second area not overlapping adjacent resonators of the plurality of resonators are determined based on a magnetic field in the first area and a magnetic field in the second area.

4. The resonating apparatus of claim 3, wherein the plurality of resonators are disposed to reduce resonance coupling between each of the plurality of resonators and an adjacent resonator of the plurality of resonators based on a characteristic that a direction of a magnetic field of an overlapping area in each of the plurality of resonators in which each of the plurality of resonators overlaps the adjacent resonator is opposite to a direction of a magnetic field of a non-overlapping area in each of the plurality of resonators in which each of the plurality of resonators does not overlap the adjacent resonator.

5. The resonating apparatus of claim 3, wherein the plurality of resonators are disposed to minimize an H-field surface integral value of each of the plurality of resonators.

6. The resonating apparatus of claim 3, wherein at least one of the plurality of resonators is divided into two areas having mutual fluxes in opposite directions, the two areas being disposed to cause absolute values of the mutual fluxes of the two areas to be equal to one another or within a predetermined range of one another.

7. The resonating apparatus of claim 3, wherein the plurality of resonators comprise at least three resonators.

8. A transmission resonating apparatus comprising:
   a plurality of transmission resonators disposed on a same plane, each of the plurality of transmission resonators being configured to form a resonant mode with an adjacent transmission resonator among the plurality of transmission resonators; and
   a feeder configured to inject power into the plurality of transmission resonators at an operating frequency set to decrease resonance coupling between each of the plurality of transmission resonators and the adjacent transmission resonator based on the resonant mode.

9. The transmission resonating apparatus of claim 8, wherein a difference between the operating frequency and a frequency corresponding to the resonant mode is than or equal to a predetermined value.

10. The transmission resonating apparatus of claim 8, wherein the resonant mode comprises either one or both of an even mode in which a magnetic field generated in each of the plurality of transmission resonators and a magnetic field generated in the adjacent transmission resonator have a same direction, and an odd mode in which the magnetic field generated in each of the plurality of transmission resonators and the magnetic field generated in the adjacent transmission resonator have opposite directions.

11. The transmission resonating apparatus of claim 10, wherein the resonant mode is the even mode; and
    a difference between the operating frequency and a frequency corresponding to the even mode is less than or equal to a predetermined value.

12. The transmission resonating apparatus of claim 10, wherein the resonant mode is the odd mode; and
    a difference between the operating frequency and a frequency corresponding to the odd mode is less than or equal to a predetermined value.

13. The transmission resonating apparatus of claim 8, wherein the plurality of transmission resonators are connected in parallel with each other; and
    the feeder is connected in series with the plurality of transmission resonators connected in parallel with each other to inject power at the set operating frequency into the plurality of transmission resonators.

14. The transmission resonating apparatus of claim 8, wherein the plurality of transmission resonators are connected in series with each other; and
    the feeder is connected in parallel with the plurality of transmission resonators connected in series with each other to inject power at the set operating frequency into the plurality of transmission resonators.

15. The transmission resonating apparatus of claim 8, wherein the feeder is further configured to inject power at the set operating frequency into the plurality of transmission resonators via inductive coupling.

\* \* \* \* \*